(12) United States Patent
Tremblay et al.

(10) Patent No.: US 6,275,213 B1
(45) Date of Patent: *Aug. 14, 2001

(54) TACTILE FEEDBACK MAN-MACHINE INTERFACE DEVICE

(75) Inventors: Mark R. Tremblay, Mountain View; Mark H. Yim, Palo Alto, both of CA (US)

(73) Assignee: Virtual Technologies, Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/561,782

(22) Filed: May 1, 2000

Related U.S. Application Data

(63) Continuation of application No. 09/066,608, filed on Apr. 24, 1998, now Pat. No. 6,088,017, which is a continuation of application No. 08/565,102, filed on Nov. 30, 1995, now abandoned.

(51) Int. Cl.$^7$ .................................................... G09G 5/00
(52) U.S. Cl. ................................................ 345/156; 414/5
(58) Field of Search ................................. 345/145, 146, 345/156, 158, 157; 414/1–7; 901/32–34

(56) References Cited

U.S. PATENT DOCUMENTS

| 3,919,691 | 11/1975 | Noll ................................. 340/172.5 |
| 4,414,984 | 11/1983 | Zarudiansky ......................... 128/774 |
| 4,477,043 | 10/1984 | Repperger ............................ 244/223 |
| 4,560,983 | 12/1985 | Williams ............................. 340/825 |
| 4,604,016 | 8/1986 | Joyce ..................................... 414/7 |
| 4,706,294 | 11/1987 | Ouchida .............................. 381/109 |
| 4,731,603 | 3/1988 | McRae et al. ....................... 340/407 |
| 4,795,296 | 1/1989 | Jau ......................................... 414/5 |
| 4,800,721 | 1/1989 | Cemenska et al. ..................... 60/393 |
| 4,823,634 | 4/1989 | Culver ................................... 74/471 |
| 4,868,549 | 9/1989 | Affinito et al. ...................... 340/710 |

(List continued on next page.)

FOREIGN PATENT DOCUMENTS

| 0085518 | 8/1983 | (EP) . |
| 0265011 | 4/1988 | (EP) . |
| 0607580A1 | 7/1994 | (EP) . |
| 0626634A2 | 11/1994 | (EP) ................................. G06F/3/00 |
| 2254911A | 10/1992 | (GB) . |
| WO92/00559 | 1/1992 | (WO) . |
| WO96/09695 | 3/1996 | (WO) ............................. H04B/3/36 |

OTHER PUBLICATIONS

Schmult, Brian et al., "Application Areas for a Force–Feedback Joystick," ASME 1993, DSC–vol. 49, pp. 47–54.

Howe, Robert D., "Task Performance with a Dextrous Teleoperated Hand System," Proceedings of SPIE, 1992, vol. 1883, pp. 1–9.

Russo, Massimo Andrea, "The Design and Implementation of a Three Degree–of–Freedom Force Output Joystick," Department of Mechanical Engineering, May 11, 1990, pp. 9–40 & 96 & 97.

(List continued on next page.)

*Primary Examiner*—Regina Liang
(74) *Attorney, Agent, or Firm*—James R. Riegel

(57) ABSTRACT

A man-machine interface which provides tactile feedback to various sensing body parts is disclosed. The device employs one or more vibrotactile units, where each unit comprises a mass and a mass-moving actuator. As the mass is accelerated by the mass-moving actuator, the entire vibrotactile unit vibrates. Thus, the vibrotactile unit transmits a vibratory stimulus to the sensing body part to which it is affixed. The vibrotactile unit may be used in conjunction with a spatial placement sensing device which measures the spatial placement of a measured body part. A computing device uses the spatial placement of the measured body part to determine the desired vibratory stimulus to be provided by the vibrotactile unit. In this manner, the computing device may control the level of vibratory feedback perceived by the corresponding sensing body part in response to the motion of the measured body part. The sensing body part and the measured body part may be separate or the same body part.

60 Claims, 20 Drawing Sheets

U.S. PATENT DOCUMENTS

| | | | |
|---|---|---|---|
| 4,949,119 | 8/1990 | Moncrief et al. | 364/578 |
| 4,983,901 | 1/1991 | Lehmer | 318/685 |
| 5,044,956 | 9/1991 | Behensky et al. | 434/45 |
| 5,076,517 | 12/1991 | Ferranti et al. | 244/228 |
| 5,103,404 * | 4/1992 | McIntosh | 414/5 |
| 5,107,262 | 4/1992 | Cadoz et al. | 341/22 |
| 5,146,566 | 9/1992 | Hollis, Jr. et al. | 395/275 |
| 5,184,319 | 2/1993 | Kramer | 364/806 |
| 5,185,561 | 2/1993 | Good et al. | 318/432 |
| 5,186,629 | 2/1993 | Rohen | 434/114 |
| 5,193,963 | 3/1993 | McAffee et al. | 414/5 |
| 5,203,563 | 4/1993 | Loper, III | 273/148 |
| 5,209,661 | 5/1993 | Hildreth et al. | 434/45 |
| 5,220,260 | 6/1993 | Schuler | 318/561 |
| 5,223,776 | 6/1993 | Radke et al. | 318/568 |
| 5,286,203 | 2/1994 | Fuller et al. | 434/45 |
| 5,296,871 | 3/1994 | Paley | 345/163 |
| 5,354,162 | 10/1994 | Burdea et al. | 414/5 |
| 5,366,376 | 11/1994 | Copperman et al. | 434/69 |
| 5,368,484 | 11/1994 | Copperman et al. | 434/69 |
| 5,381,080 | 1/1995 | Schnell et al. | 318/566 |
| 5,388,992 | 2/1995 | Franklin et al. | 434/114 |
| 5,396,266 | 3/1995 | Brimhall | 345/161 |
| 5,399,091 | 3/1995 | Mitsumoto | 434/61 |
| 5,405,152 | 4/1995 | Katanics et al. | 273/438 |
| 5,414,337 | 5/1995 | Schuler | 318/561 |
| 5,451,924 | 9/1995 | Massimino et al. | 340/407.1 |
| 5,482,051 | 1/1996 | Reddy et al. | 128/733 |
| 5,512,919 | 4/1996 | Araki | 345/156 |
| 5,513,100 | 4/1996 | Parker et al. | 364/167.01 |
| 5,542,672 | 8/1996 | Meredith | 463/37 |
| 5,559,432 | 9/1996 | Logue | 324/207 |
| 5,565,840 | 10/1996 | Thorner et al. | 340/407.1 |
| 5,576,727 | 11/1996 | Rosenberg et al. | 345/179 |
| 5,583,478 | 12/1996 | Renzi | 340/407.1 |
| 5,587,937 | 12/1996 | Massie et al. | 364/578 |
| 5,589,828 | 12/1996 | Armstrong | 341/20 |
| 5,589,854 | 12/1996 | Tsai | 345/161 |
| 5,629,594 | 5/1997 | Jacobus et al. | 318/568 |
| 5,631,861 * | 5/1997 | Kramer | 414/5 |
| 5,634,794 | 6/1997 | Hildreth et al. | 434/69 |
| 5,642,469 | 6/1997 | Hannaford et al. | 395/99 |
| 5,643,087 | 7/1997 | Marcus et al. | 463/38 |
| 5,666,138 | 9/1997 | Culver | 345/161 |
| 5,666,473 | 9/1997 | Wallace | 345/420 |
| 5,684,722 | 11/1997 | Thorner et al. | 364/578 |
| 5,691,898 | 11/1997 | Rosenberg et al. | 364/190 |
| 5,709,219 | 1/1998 | Chen et al. | 128/782 |
| 5,714,978 | 2/1998 | Yamanaka et al. | 345/157 |
| 5,734,373 | 3/1998 | Rosenberg et al. | 345/161 |
| 5,736,978 | 4/1998 | Hasser et al. | 345/173 |
| 5,739,811 | 4/1998 | Rosenberg et al. | 345/161 |
| 5,742,278 | 4/1998 | Chen et al. | 345/156 |
| 5,754,023 | 5/1998 | Roston et al. | 318/561 |
| 5,755,577 | 5/1998 | Gillio | 434/262 |
| 5,767,839 | 6/1998 | Rosenberg | 345/161 |
| 5,781,172 | 7/1998 | Engel et al. | 345/164 |
| 5,784,052 | 7/1998 | Keyson | 345/167 |
| 5,790,108 | 8/1998 | Salcudean et al. | 345/184 |
| 5,805,140 | 9/1998 | Rosenberg et al. | 345/161 |
| 5,889,670 | 3/1999 | Schuler et al. | 364/186 |
| 5,889,672 | 3/1999 | Schuler et al. | 364/188 |
| 5,897,437 | 4/1999 | Nishiumi et al. | 463/47 |
| 5,944,151 | 8/1999 | Jakobs et al. | 188/267.1 |
| 5,986,643 | 11/1999 | Harvill et al. | 345/156 |
| 6,004,134 | 12/1999 | Marcus et al. | 434/45 |
| 6,088,017 * | 7/2000 | Tremblay et al. | 345/156 |
| 6,104,158 | 8/2000 | Jacobus et al. | 318/568.11 |
| 6,184,868 | 2/2001 | Shahoian et al. | 345/161 |

OTHER PUBLICATIONS

Su, S. Augustine et al., "The Virtual Panel Architecture: A 3D Gesture Framework," IEEE 0–7803–1363–1, 1993.

Hasser, Christopher John, "Tactile Feedback for a Force–Reflecting Haptic Display," The School of Engineering, University of Dayton, Dec. 1995, pp. iii–xii & 1–96.

Ellis, R.E. et al., "Design and Evaluation of a High–Performance Prototype Planar Haptic Interface," ASME Dec. 3, 1993, DSC–vol. 49, pp. 55–64.

Burdea, Grigore et al., "A Portable Dextrous Master with Force Feedback," Presence: Teleoperators and Virtual Environments, MIT Press, Jun. 1991.

Adlestein, Bernard D. et al., "Design and Implementation of a Force Reflecting Manipulandum for Manual Control Research," 1992, pp. 1–24.

Minsky, Margaret et al., "Feeling and Seeing: Issues in Force Display," ACM 089791–351–5, 1990, pp. 235–242.

Ouh–young, M. et al., "Creating an Illustion of Feel: Control Issues in Force Display," Computer Science Dept., Univ of N. Carolina, 1989, pp. 1–14.

Millman, P. et al., "Design of a Four Degree–of–Freedom Force–Relecting Manipulandum with a Specified Force/Torque Workspace," IEEE CH2969–4, 1991, pp. 1488–1492.

Kilpatrick, P., "The Use of a Kinesthetic Supplement in an Interactive Graphics System," Univ. of N. Carolina, 1976, pp. 1–175.

Akamatsu, M. et al., "Multimodal Mouse: A Mouse–Type Device with Tactile and Force Dsiplay," Presence, vol. 3, No. 1, 1994, pp. 73–80.

Hirota, Koichi et al., "Development of Surface Display," IEEE 0–7803–1363–1, 1993, pp. 256–262.

Atkinston, William D. et al, "Computing with Feeling," Comput. & Graphics, vol. 2, 1977, pp. 97–103.

Brooks, F. et al., "Project Grope—Haptic Displays for Scientific Visualization," Computer Graphics, vol. 24, No. 4, 1990, pp. 177–185.

Batter, James J. et al., "Grope–1: A Computer Display to the Sense of Feel," Proc. IFIP Congress, 1971, pp. 759–763.

Winey III, C., "Computer Simulated Visual and Tactile Feedback as an Aid to Manipulator and Vehicle Control," Mass. Institute of Tech., Mech. Engineering, 1981, pp. 1–79.

Burdea, G. et al., "Distributed Virtual Force Feedback," IEEE Workshop on Force Display on Virtual Environments and its Application to Robotic Teleoperation, 1993, pp. 25–44.

Hasser, C. et al., "Tactile Feedback with Adaptive Controller for a Force–Reflecting Haptic Display," Parts 1&2, IEEE 0–7803–3131–1, 1996, pp. 526–553.

Kelley, A. J. et al., "MagicMouse: Tactile and Kinesthetic Feedback in the Human–Computer Interface using an Electromagentically Actuated Input/Output Device," Dept. of Elec. Eng., Univ. of Brit. Columbia, 1993, pp. 1–27.

Wiker, Steven F. et al., "Development of Tactile Mice for Blind Access to Computers: Importance of Stimulation Locus, Object Size, and Vibrotactile Display Resolution," Proceedings of the Human Factors Society 35th Annual Meeting 1991, pp. 708–712.

Gotow, J.K., et al., "Perception of Mechanical Properties at the Man–Machine Interface," IEEE 1987, pp. 688–689.

Iwata, Hiroo, "Artificial Reality with Force–feedback: Development of Desktop Virtual Space with Compact Master Manipulator," Computer Graphics, vol. 24, No. 4, 1990, pp. 165–170.

Rosenberg, Louis B. et al., "Perceptual Decomposition of Virtual Haptic Surfaces," Proc. IEEE Symp. on Research Frontiers in Virtual Reality, Oct. 1993.

Rosenberg, Louis B., "Virtual Haptic Overlays Enhance Performance in Telepresence Tasks," Stanford Univ., Dept. of Mech. Eng., 1994.

Rosenberg, Louis B., "Virtual Fixtures as Tools to Enhance Operator Performance in Telepresence Environments," SPIE Telemanipulator Technology, 1993.

Rosenberg, Louis B., "Perceptual Design of A Virtual Rigid Surface Contact," Center for Design Research, Stanford University, Armstrong Laboratory, AL/CF–TR–1995–0029, 1993, pp. 1–40.

Rutherford, M. "Third Generation Digital Flight Controls," CAE Electronics, Ltd., The Royal Aeronautical Society, 1984 Spring Convention Future Applications and Prospects for Flight Simulation, May 9–10, 1984, paper No. 15.

Baradat, Jean and Lacroix, Michel, "Advanced Features in Control Loading and Motion Systems for Simulators," National Security Industrial Association $1^{st}$ Interservice/Industry Training Equipment Conference Proceedings, Nov. 27–29, 1981.

Norlin, Ken A., "Flight Simulation Software at NASA Dryden Flight Research Center," American Institute of Aeronautics and Astronautic's Flight Simulation Technologies Conference, Baltimore, MD, Aug. 7–10, 1995.

Corrao, Joseph M., "Control Loading," American Institute of Aeronautics and Astronautic's Flight Simulation Update 1987, Jan. 12–16, 1987.

Corrao, J.M., "Control Loading," American Institute of Aeronautics and Astronautic's Flight Simulation Update 1988, Jan. 11–15, 1988.

Rinaldi, P., "Digital Control Loading—A Modular Approach," International Air Transport Association $6^{th}$ Meeting of the Flight Simulator Technical Sub–Committee, Montreal, Jun. 1–4, 1982.

Hildreth, Bruce L., Eyermann, Roger E. and Trankle, Thomas D., "DC Servo–Motors for High Performance High Reliability Control Loading in Flight Simulators," American Defense Preparedness Association $12^{th}$ Interservice/Industry Training System Conference, Nov. 6–8, 1990.

Baigrie, Stephen A., Reflectone Inc., "Electric Control Loading—A Low Cost, High Performance Alternative," American Defense Preparedness Association $12^{th}$ Interservice/Industry Training System Conference, No. 6–8, 1990.

"Digital Control Loading", Giel et al., Summary, Paper 1, Paper 2, Paper 3, International Air Transport Association, Seventh Flight Simulator Technical Sub–Committee Meeting, Agenda Item 10, Montreal, Sep. 17–20, 1984.

Seidensticker, Steve, "Application of Microcomputers to the Simulator 'Linkage' Problem," National Security Industrial Association $4^{th}$ Interservice/Industry Training Equipment Conference Proceedings, Nov. 16–18, 1982.

Albers, F. Gerry, "Microcomputer Base for Control Loading," Naval Training Equipment Center $11^{th}$ NTEC–Industry Conference Proceedings, NAVTRAEQUIPCEN IH–306, Nov. 14–16, 1978.

Flight Simulation, Rolfe, J.M. and Staples, K. J., eds., 1986.

* cited by examiner

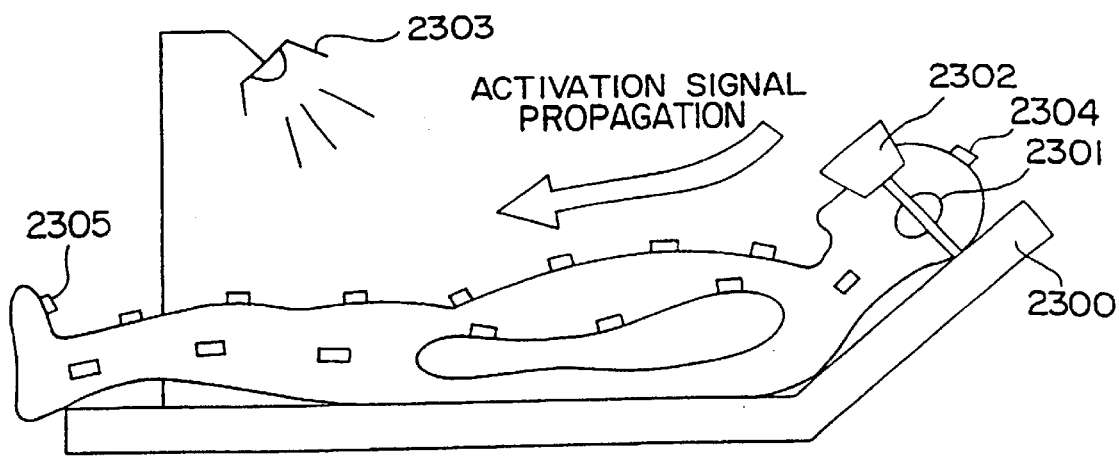
FIG. 23
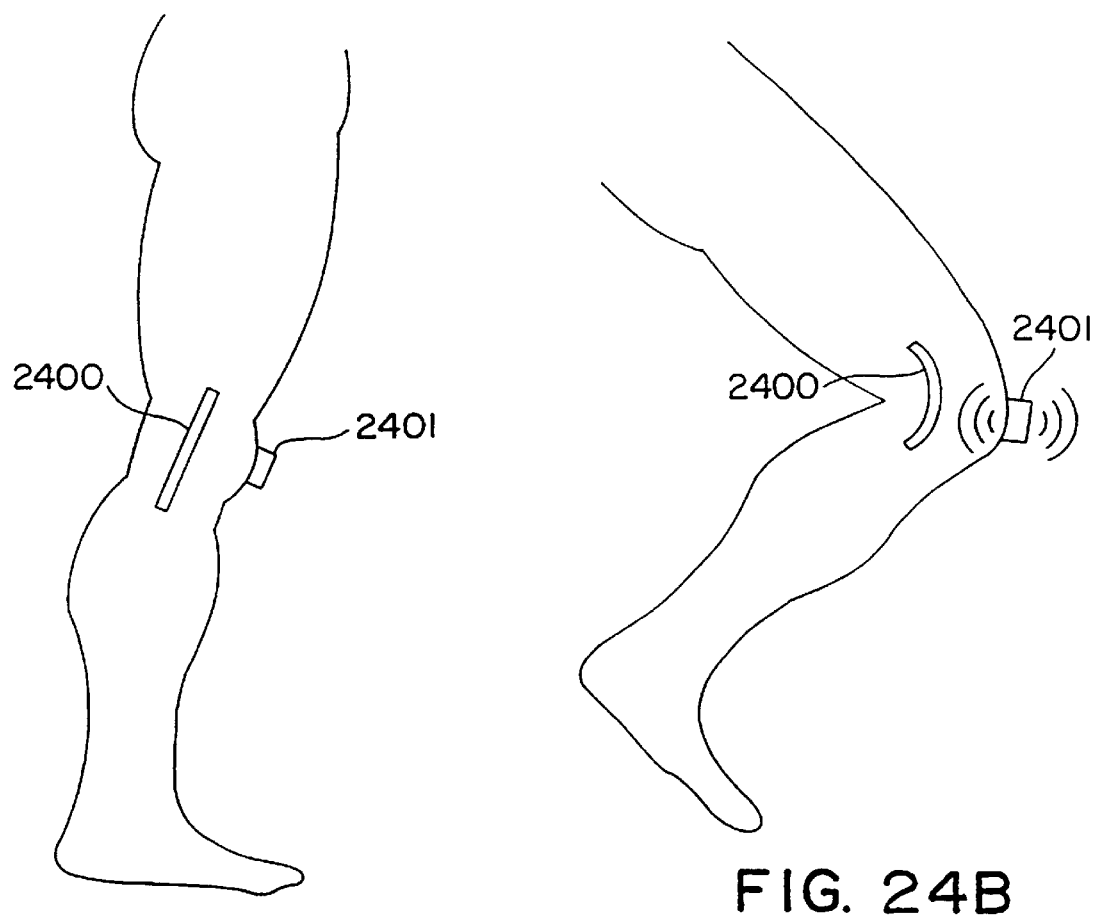
FIG. 24A
FIG. 24B

TACTILE FEEDBACK MAN-MACHINE INTERFACE DEVICE

This is a continuation of application Ser. No. 09/066,608 filed Apr. 24, 1998, now U.S. Pat. No. 6,088,017 which is a continuation of application Ser. No. 08,565,102 filed Nov. 30, 1995, abandoned.

TECHNICAL FIELD

This invention relates to a man-machine interface and in particular to an interface that provides tactile sensation to a user.

BACKGROUND OF THE INVENTION

Virtual reality (VR) is an immersive environment which is created by a computer and with which users have real-time, multisensorial interactions. Typically, these interactions involve some or all of the human senses through either visual feedback, sound, force and tactile feedback (i.e. reflection), smell and even taste. The key to immersive realism is the capacity of the user to use his/her hand to interactively manipulate virtual objects. Unfortunately, the majority of existing commercial virtual reality systems use hand-sensing devices that provide no haptic feedback. Nevertheless, some efforts have been made to provide means for presenting force and tactile information to the user's hand. By force information, it is meant the application of a set force to a selected part of the hand, for example, a finger. By tactile information, it is meant the application of a stimuli, e.g., a vibration, to a selected part of the hand, e.g., a fingertip pad. This stimulus, could simulate surface texture or dynamic conditions at the contact, for example. A few examples of existing force reflecting devices are the EXOS SAFiRE™, the Master II Hand Master device at Rutgers university, the PERCRO Force-Reflecting Hand Master and the Sarcos TOPS Force-Reflecting Hand Master. Some tactile feedback devices that have been developed include the PERCRO Position-Sensing and Tactile Feedback Hand Master and the EXOS TouchMaster™.

Virtual reality is not the only field where it is desirable to feed back force and tactile information to a human user/operator. Another common area is telerobotics. Some of the devices mentioned above are also often used as telerobotics interfaces. Some examples in the literature of feedback devices designed more specifically for telerobotics include the tactile shape sensing and display system developed by Kontarinis et al., the voice-coil based tactile feedback device used by Patrick et al. and the pin-based tactile display array developed by Kaczmarek and Bach-y-rita. Other applications for a vibrotactile unit of the subject invention include, but are not limited to, gesture recognition, music generation, entertainment and medical applications.

In an ideal case, it would be desirable to provide full force and tactile feedback to a user to make the virtual reality or telerobotic experience as realistic as possible. Unfortunately, most force feedback devices are cumbersome, heavy, expensive and difficult to put on and remove. Many of the tactile feedback solutions are also cumbersome, complex and fragile. Additionally, some of the tactile feedback devices described in the literature, such as small voice coils mounted to directly contact the skin, tend to numb the skin after only a few seconds of operation and then become ineffective as feedback devices.

SUMMARY OF THE INVENTION

An object of the invention is a man-machine interface which may be employed in such areas as interactive computer applications, telerobotics, gesture recognition, music generation, entertainment, medical applications and the like. Another object of the invention is a mass which is moved by a "mass-moving actuator" which generates a vibration that a user can feel. Yet another object of the invention is the generation of an activating signal to produce the vibrations either as a result of the user's state or as a result of environmental conditions, whether virtual or physical. Still another object of the invention is vibrating the bone structure of a sensing body part, as well as skin mechanoreceptors, to provide feedback. Yet still another object of the invention is the complex actuation of vibratory devices.

The tactile sensation that a user feels is generated by a vibrotactile unit mounted on, or in functional relation to, a sensing body part of a user by a fastening means. In one embodiment, the vibrotactile device comprises a mass connected eccentrically to a mass-moving actuator shaft (i.e. the center of mass of the mass is offset from the axis of rotation). Energizing the mass-moving actuator causes the shaft to turn, which rotates the eccentric mass. This rotating mass causes a corresponding rotating force vector. A rapidly rotating force vector feels to the user as a vibration. A slowly rotating force vector feels like a series of individual impulses. For a small number of rapid rotations, the rotating force vector feels like a single impulse. We will use the term "vibration" to denote a change in force vector (i.e., direction or magnitude). Examples of vibrations include, but are not limited to a single impulse, a sinusoidal force magnitude, and other functions of the force vector. We use the term "tactile sensation" to refer to the feeling perceived by a user when their sensing body part experiences vibrations induced by a vibrotactile unit.

A signal processor interprets a state signal and produces an activating signal to drive the mass-moving actuator. The variable components of the state signal may be physical (e.g., measured), or virtual (e.g. simulated, or internally generated); they may vary with time (e.g., the state variables may represent processes); and they may be integer-valued (e.g., binary or discrete) or real-valued (e.g., continuous). The signal processor may or may not comprise a computer which interprets and further processes the state signal. The signal processor comprises a signal driver which produces an activating signal supplying power to, or controlling the power drawn by, the vibrotactile unit. The power may be, but is not restricted to, electric, pneumatic, hydraulic, and combustive types. The driver may be, but is not restricted to, an electric motor controller comprising a current amp and sensor for closed loop control, a flow valve controlling the amount of a pressurized fluid or gas, a flow valve controlling the amount of fuel to a combustion engine and the like. The details of such a signal processor and mass-moving actuator are common knowledge to someone skilled in the art.

The state signal may be generated in response to a variety of conditions. In one embodiment, one or more sensors measuring physical conditions of the user and/or the user's environment may generate one or more components of a physical state signal. In another embodiment, a computer simulation may determine the one or more components of a virtual state signal from a simulated (e.g., virtual) state or condition. The virtual state may optionally be influenced by a physical state. The virtual state includes anything that a computer or timing system can generate including, but not restricted to, a fixed time from a previous event; the position, velocity, acceleration (or other dynamic quantity) of one or more virtual objects in a simulation; the collision of two virtual objects in a simulation; the start or finishing of a computer job or process; the setting of a flag by another process or simulation; combinations of situations; and the like. The virtual state signal is a machine-readable measurement of the virtual state variables.

The physical state signal is measured from physical state variables. These variables have relevance to the physical state of a body part of the user or the user's physical environment. The physical state variables includes any measurable parameter in the environment or any measurable parameter relating to a body part of the user. Some examples of measurable physical parameters in an environment include but are not restricted to, the state of a body part, the position of objects in the environment, the amount of energy imparted to an object in the environment, the existence of an object or objects in the environment, the chemical state of an object, the temperature in the environment, and the like. The state of a body part may include the physical position, velocity, or acceleration of the body part relative to another body part or relative to a point in the environment. The state of a body part may also include any bodily function, where the measured state signal may include the output from an electroencephalograph (EEG), electrocardiograph (ECG), electromyograph (EMG), electrooptigraph (EOG) or eye-gaze sensor, and sensors which measure joint angle, heart rate, dermal or subdermal temperature, blood pressure, blood oxygen content (or any measurable blood chemical), digestive action, stress level, voice activation or voice recognition, and the like. The user's voice may constitute a measured physical state variable, where his spoken words are sensed and/or recognized to generate a corresponding activating signal. The physical state signal is a machine-readable measurement of the physical state variables.

The state signal is presented to the signal processor which interprets the state, and then determines how and when to activate the vibrotactile units accordingly. The signal processor produces an activating signal which may be in response to an event it interprets from the state signal. Examples of events include contact, gestures, spoken words, onset of panic or unconsciousness, and the like. The interpretation of the state signal may or may not be a binary event, i.e. the simple changing of state between two values. An example of a binary event is contact vs. non-contact between two virtual or real objects. The process of interpreting may include any general function of state variable components. The interpretation function may produce an output control value which is integer or real-valued. A non-binary-valued interpretation output typically relates to the signal processor producing a non-binary activation signal.

By varying the functional form of the activation signal, the type of feedback that the vibrotactile device generates may also be varied. The device may generate a complex tactile sensation, which is defined to be a non-binary signal from a single or multiple vibrotactile units. Examples of complex tactile sensations include (1) varying the amplitude of vibration with a profile which is non-uniform over time; (2) varying the frequency of vibration; (3) varying the duration of impulses; (4) varying the combination of amplitude and frequency; (5) vibrating two or more vibrotactile units with a uniform or non-uniform amplitude profile; (6) sequencing multiple vibrotactile units with different amplitude or frequency profiles; and the like.

The frequency and amplitude of the vibration or impulse may be changed by modifying the activating signal to the mass-moving actuator. The frequency and amplitude may also be controlled by increasing the mass or by changing the radius of gyration (e.g. changing its eccentricity). For example, the mass may be changed by pumping fluid into an eccentrically rotating container. The sense of frequency that the user perceives may be changed independently of the amplitude by modulating the power to the vibrotactile unit at a variable frequency. This technique is called amplitude modulation, which is common knowledge to those skilled in the art. This change in frequency and amplitude may be used to convey complex, compound or other forms of information to the user.

Sensors may be mounted on the vibrotactile unit or the sensing body part to determine the frequency and amplitude of vibration sensed by the user. A feedback control loop may be added which uses this information to more tightly control the frequency and amplitude, or to reach peak efficiency at the resonant frequency of the collective vibrating device-body system.

Examples of a sensing body part on which the vibrotactile unit may be mounted, or in functional relation to the vibrotactile unit, include, but are not limited to: the distal part of a digit, the dorsal (back) side of a phalanx or metacarpus, palm, forearm, humerus, underarm, shoulder, back, chest, nipples, abdomen, head, nose, chin, groin, genitals, thigh, calf, shin, foot, toes, and the like. A plurality of vibrotactile units may be disposed on or near different sensing body parts, and may be activated in unison or independently.

Each vibrotactile unit may be affixed to the body by a fastening means. The fastening means is defined to be the means of attaching the vibrotactile unit to a sensing body part, transmitting (and possibly modifying) the vibrations created by the vibrotactile unit. This means may be one that is flexible such as a strap made of cloth or soft polymer, or rigid, such as metal or hard polymer which grabs or pinches the flesh, skin or hair. The fastening means may also include gluing or taping to the skin or hair, or tying with a string or rope around a limb, or attaching to clothes with Velcro® or similarly functional means. A vibrotactile unit may also be attached to another structure which is then attached to the body part with the same means just mentioned. The vibrations generated by the actuator may be transmitted to the sensing body part by the structure (rigid or non-rigid), or through a linkage transmission or a fluid transmission.

The eccentric mass need not be mounted directly onto a motor shaft. A mechanical transmission may rotate the mass on a different shaft than the motor shaft. The mass-moving actuator rotates this shaft. Fluids such as air and liquids may also transmit the motion from a power source to the rotating eccentric mass. Changing magnetic fields may also be employed to induce vibration of a ferrous mass.

As previously mentioned, state signals may relate to a physical or virtual state. When the state represents a physical condition, the subject invention includes a state measurement sensor which produces a state signal. This state measurement sensor may measure some property of the sensing body part. Recall that the body part associated with receiving the vibrotactile stimulation is called the sensing body part, the body part associated with producing the activating signal is called the measured body part. The signal processor may receive signals from this sensor such as a tactile, position, bend, velocity, acceleration or temperature sensor and generate an activating signal. In this way, the user may receive feedback based on his actions or physical state. For example, the vibrotactile device may be used to train the user to do some physical motion task. In this case, the position or motion of the body part which is to do the motion task is measured by the state measurement sensor and is also the sensing body part. Direct stimulation to the body part being trained enhances the training of the task. Complex actuation in the form of a function of different levels of frequency or amplitude may inform the user whether his actions are correct or incorrect; the level of correctness may correspond to the level of frequency or amplitude.

In addition, the sensing body part (which is also the measured body part) may have a graphical representation shown to the user. The user may also be presented with visual, auditory, taste, smell, force and/or temperature cues to his actions in combination with the vibrotactile cues provided by the subject invention. The user may be immersed in a virtual environment. The user may see a graphical representation of his/her body part interact with virtual objects and simultaneously feel a corresponding tactile sensation simulating the interaction. For example a user may have his/her fingers be the sensing and measured body parts. The user may then see his/her virtual hand in the virtual environment contact a virtual object. The user would then feel an increasing vibratory stimulation on his/her physical fingertip as he increased the virtual pressure on the virtual object using the virtual fingertip.

As previously discussed, using the vibrotactile device of the subject invention, a user may receive tactile sensations based on the state of his body parts. In the previous case the state included the position, and other dynamic quantities, of the body parts. In certain applications, the measured body part is the same as the sensing body part (the list of possible sensing body parts mentioned earlier also applies to measured body parts); in other applications they are different body parts. When the measured body part is different than the sensing body part, the subject invention acts as a coupling device which relates the sensing body part and the measured body part.

In another application, the user may receive tactile feedback as a result of the conditions of a computer simulated environment, not necessarily related to the user's actions or state. The vibrotactile units with varying actuation levels may be used to simulate a variety of contact situations, e.g., contact with fluids and solids, and contacts which are momentary or continuous. For example, a user immersed in a computer simulated virtual environment may feel simulated fluid (like air or water) across his body. In such a simulation, an array of vibrotactile units may vibrate in sequence to correspond to a pressure wave hitting the corresponding parts of the body; the amplitude of the vibration may vary to correspond to different levels of pressure being simulated. A user may also feel a virtual object that comes into contact with a portion of his virtual body. The user may feel a virtual bug crawl up his virtual arm by sequencing an array of vibrotactile units. To accompany the tactile sensations received by the user which are uncorrelated with his actions, the user may be presented with visual, auditory, taste, smell, force, temperature and other forms of feedback in order to enhance the realism of the simulated environment.

In yet another application of the vibrotactile device, a group of users may receive tactile sensations. In one example, users may wear individual vibrotactile units, or they may also share vibrotactile units as follows. A tactile sensation may be shared by one or more users making physical contact with the sensing body part of another user. For example, one user may wear vibrotactile units on the backs of his fingers. A second user, not wearing any vibrotactile units, may obtain vibrotactile feedback transmitted via the first user when the first user places the palmar side of his fingers on a sensing body part of the second user. The activating signal for vibrotactile unit may be computer controlled via either user's actions or through a computer simulated event. In a second example, a group of users may each receive identical tactile feedback through individually mounted vibrotactile units. The common activating signal may correspond to measured body parts from a single, optionally separate, user. Different users may also be responsible for producing the common activating signal for one or more vibrotactile units. For instance, the movement of one user's arm may control the vibrotactile unit on each user's arm; and the voice of a second user may control the vibrotactile unit on each user's back; the eye-gaze of free other users may control the vibrotactile unit upon which they stare in unison. An example application of a single user controlling many user's vibrotactile sensations is a new form of entertainment where a performer creates vibrotactile sensations for an audience.

In a preferred embodiment, the vibrotactile units are affixed to an instrumented glove, such as the CyberGlove™ manufactured by Virtual Technologies of Palo Alto, Calif., USA. The Cyber-Glove has sensors in it which measure the angles of the joints of the hand. The fingertips of the CyberGlove are open so that the user may reliably handle physical objects while wearing the glove. The open fingertips allow the user to feel the sensations of real objects in conjunction with the generated vibrotactile sensations. The fingertips need not be open, they may be fully enclosed as in the 22-sensor model of the CyberGlove. The mass-moving actuator of each vibrotactile unit is encased in a cylindrical housing and mounted onto the glove on each of the fingers and thumb, and on the palmar side of the hand. Each mass-moving actuator is composed of a small DC motor with an eccentric mass mounted rigidly onto the shaft of the motor. The casing is made of tubular plastic and serves to protect the motion of the mass from the user and protect the user from the rotating mass. The casing may be made of any rigid or semi-rigid material including but not limited to steel, aluminum, brass, copper, plastic, rubber, wood, composite, fiberglass, glass, cardboard, and the like. The casing may form a solid barrier, a wire-mesh, grid or column-like support capable of transmitting vibrations from the mass-moving actuator to the fastening means. The instrumented glove informs a computer of the position of the user's hand and fingers. The computer, which is part of the signal processor, then interprets this hand state signal (and any virtual state signal if the application calls for it). The computer then generates a control signal, which when processed by the driver, activates the actuators to create tactile sensations.

One feature of the embodiment of the subject invention just described, which employs an eccentric mass, is that the energy imparted into the system can be less than the energy required when using electromagnetic coils (such as the speaker voice coils used by Patrick et al. and the EXOS TouchMaster). Energy is stored as rotational inertia in the eccentric mass, whereas the voice-coil-based systems lose all inertial energy each time the coil change directions.

Another feature of the subject invention is that vibrating the bone structure of a body part, as well as skin mechanoreceptors, has an advantage over stimulating just the skin mechanoreceptors (such as Meissner, Merkel, Ruffini and Pacinian corpuscles) in that the nerves do not get easily overstimulated and do not become numb. In addition, the form of information to the user is closer to a physical contact sensation where the muscles and joints are stimulated, as is done by full force feedback systems. As a result, the vibrotactile units need not be attached to a body part which has sensitive skin mechanoreceptors. For example, a vibrotactile unit may be attached to a fingernail or an elbow.

In an embodiment in which a user is immersed in a computer simulated environment, actuation of vibrotactile units can approximate the sensation of touching physical objects as full force feedback devices do. The deep impulsive sensation in the muscles and joints generated by the vibrotactile units simulates the change in proprioceptive state as the user touches a virtual object. The subject invention provides numerous advantages over a sustained force feedback device. For example, because of its simplicity, the vibrotactile device of the subject invention can be made smaller, lighter, less encumbering, more robustly and cheaper.

The subject invention may be used in combination with a sustained force feedback device as provided by Kramer in U.S. Pat. No. 5,184,319, Kramer in U.S. patent application Ser. No. 08/373,531 (allowed), Zarudiansky in U.S. Pat. No. 4,302,138, Burdea in U.S. Pat. No. 5,354,162, and Jacobus in U.S. Pat. No. 5,389,865. These patents and patent applications are incorporated herein by reference. Such a combination can give a higher frequency response than that capable of being generated by the sustained force feedback device and/or to reduce the cost and or size of the full system. The subject invention may also be used in combination with other tactile feedback devices such as heating or cooling devices, bladder devices or voice coils.

BRIEF DESCRIPTION OF THE DRAWINGS

FIGS. 16a, 16b, and 16c illustrate the principle, where $w_2 > w_1 > 0$.

FIG. 19a shows a virtual reality application. FIG. 19b shows a telerobotic application.

In FIG. 21a, the gesture is static and in FIG. 21b, the gesture is dynamic (the index finger is moving in a pre-determined fashion).

FIG. 23 is a schematic drawing showing an entertainment or relaxation application.

FIG. 24 is a schematic drawing showing a medical application.

DETAILED DESCRIPTION OF THE DRAWINGS

Figure 1A:
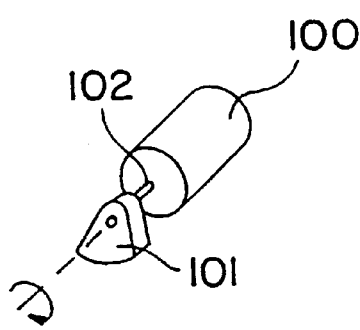
FIG. 1a is a perspective view of an electric mass-moving actuator with an eccentric mass attached to its shaft.

FIG. 1a shows one embodiment of a vibrotactile unit obtained by attaching an eccentric mass (101) to the shaft (102) of a small d.c. electric motor (100) which serves as the mass-moving actuator. Here the mass is pie-shaped, however any other shape which offsets the center of gravity from the axis of rotation, and thus provides eccentricity, may be used. This eccentricity causes the force vector to change directions during rotation and thus induces vibrations in the unit. The mass may be made of any material like steel, aluminium, plastic or fluid-encased in a container, to name a few.

Figure 1B:
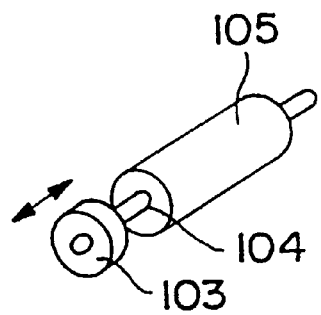
FIG. 1b is a perspective view of a mass-moving linear actuator with a mass attached to its shaft.

FIG. 1b shows another embodiment of a vibrotactile unit obtained by attaching a mass (103) to the shaft (104) of a linear mass-moving actuator (105). Here the mass is diskshaped, however any other shape may be used. The linear actuator moves the mass back and forth and thus induces vibrations in the unit by suddenly accelerating and decelerating it. The mass may be made of any material like steel, aluminium, plastic or fluid encased in a container, to name a few.

Figure 2A:
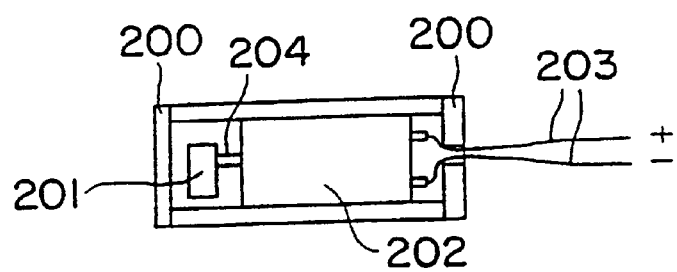
FIGS. 2a and 2b are a cross-sectional side view and a perspective view respectively of an example of a vibrotactile unit.
Figure 2B:
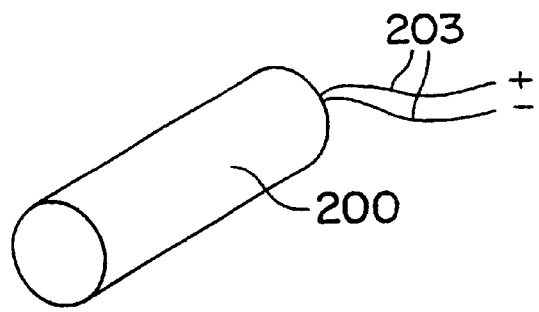

FIG. 2a and FIG. 2b are cross-sectional and perspective drawings respectively of an example of a casing (200) in which a mass-moving actuator (202) and a mass (201) are contained. Again, the eccentric mass (201) is attached to the shaft (204) of the electric motor. The casing has a hole for the motor leads (203) to escape. The casing protects the moving mass from being disturbed by the user. It also protects the user from being hit by the mass. The casing may be made from any rigid material, or variety of materials, such as aluminum, steel, plastic, glass, glass fiber composite etc. It is typically desirable to have a small light weight mass-moving actuator, mass, casing and fastening means so that the device may be as unencumbering as possible. From here on, this embodiment of the invention will serve as the sample vibrotactile unit used in many of the subsequent figures.

Figure 3:
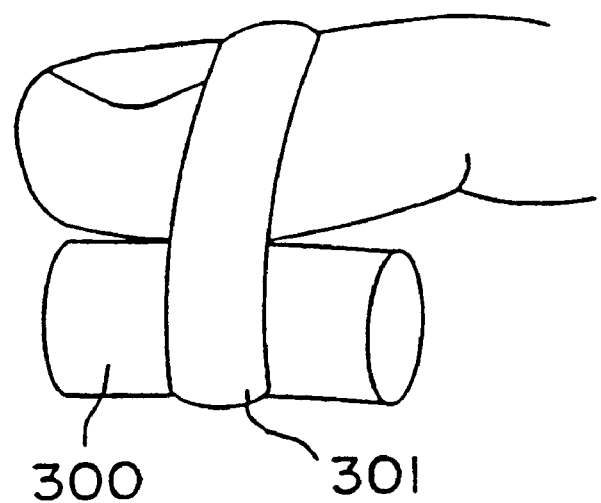
FIG. 3 is a perspective view of the vibrotactile unit shown in FIG. 2b where the vibrotactile unit is attached to the palmar side of the fingertip.

FIG. 3 illustrates one fastening means for attaching the vibrotactile unit to a finger. In this example, the vibrotactile unit (300) is attached directly to the palmar side of the fingertip using a fastening means (301). The fastening means may be made of either flexible material, such as cloth, fabric, tape, Velcro® or a soft polymer, or it may be made of a rigid material such as a metal, hard polymer or wood, to name a few. The fastening means need not encircle the finger entirely, it may grab the finger by clamping or pinching, or by sticking to it such as with glue or tape. Also, if the user is wearing a glove, the vibrotactile unit may also be sewn onto the glove or bonded to it and need not be affixed directly to the hand. This will also be the case in the following figures which illustrate various ways to position the vibrotactile unit on the human body.

Figure 4:
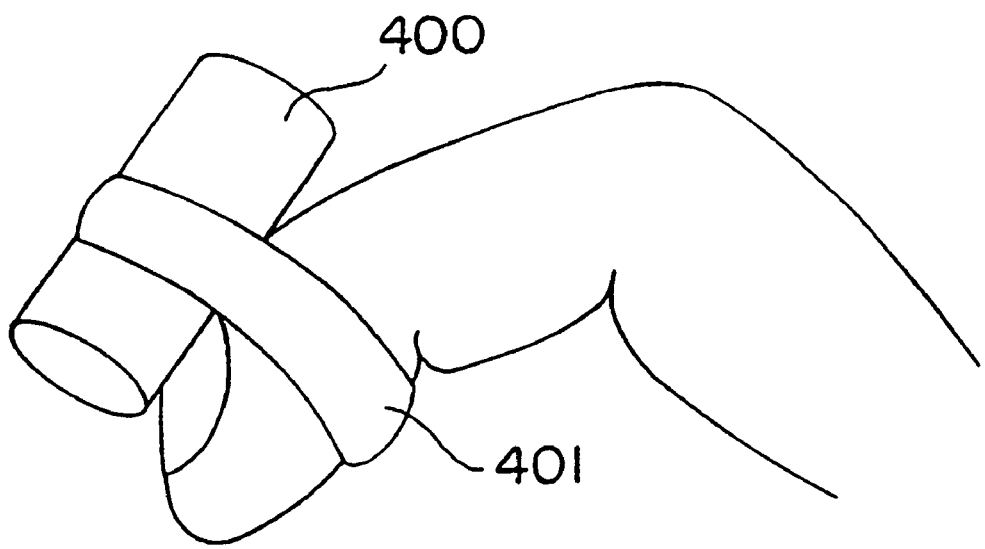
FIG. 4 is another perspective view of a vibrotactile unit attached to the dorsal side of the fingertip, where it makes contact with the nail.

FIG. 4 illustrates another way of mounting the vibrotactile unit (400) onto the finger using a fastening means (401). In this case the unit is positioned directly above the fingernail on the dorsal side of the fingertip (the sensing body part) in order to provide a distinctive tactile sensation, or vibratory stimulus. The unit may vibrate the nail, the flesh underneath and the bone with sufficient amplitude that the sensation is felt throughout the finger, not just locally at the skin.

Figure 5:
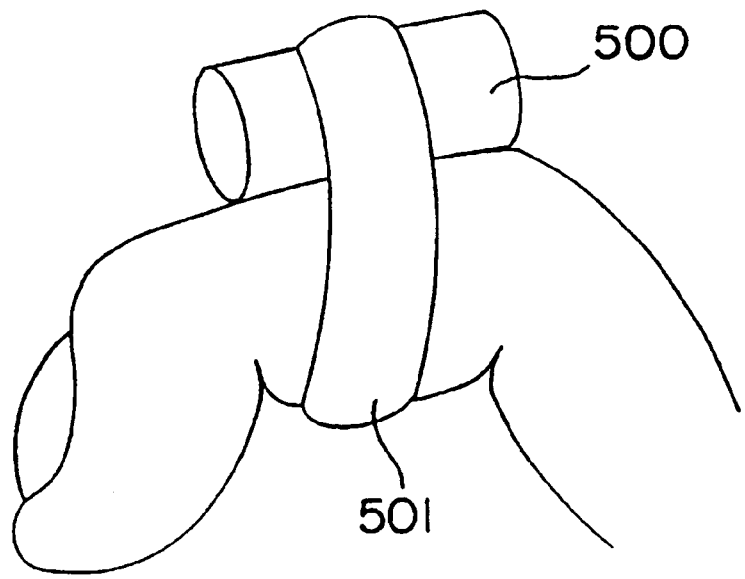
FIG. 5 is a perspective view of a vibrotactile unit attached to the dorsal side of the proximal phalanx.

FIG. 5 illustrates another way of mounting the vibrotactile unit (500) onto the finger using a fastening means (501). In this case the unit is positioned on the dorsal side of the proximal phalanx. Since the unit gives sensation throughout the entire finger, touching virtual objects with the palmar side of the hand will still give sensations to that side even though it is mounted on the back. When used in conjunction with manipulating physical objects with the palmar side, the vibrational sensation on the palmar side is enhanced. These features are not limited to the proximal phalanx. Mounting to the dorsal side of any phalanx or limb will produce the same effect.

Figure 6:
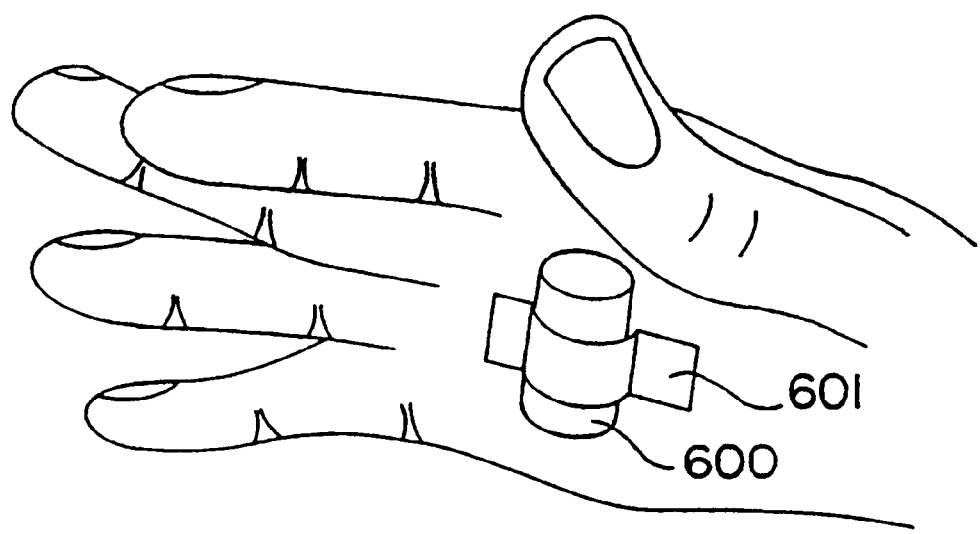
FIG. 6 is a perspective view of a vibrotactile unit attached to the palm of the hand

FIG. 6 illustrates another way of mounting the vibrotactile unit (600) onto the user using a fastening means (601). In this case the unit is positioned in the palm of the user's hand. If a glove (instrumented or not) is worn, then the unit may also be mounted inside or outside of the glove in a pocket-like cavity, and need not be explicitly affixed to the hand.

Figure 7:
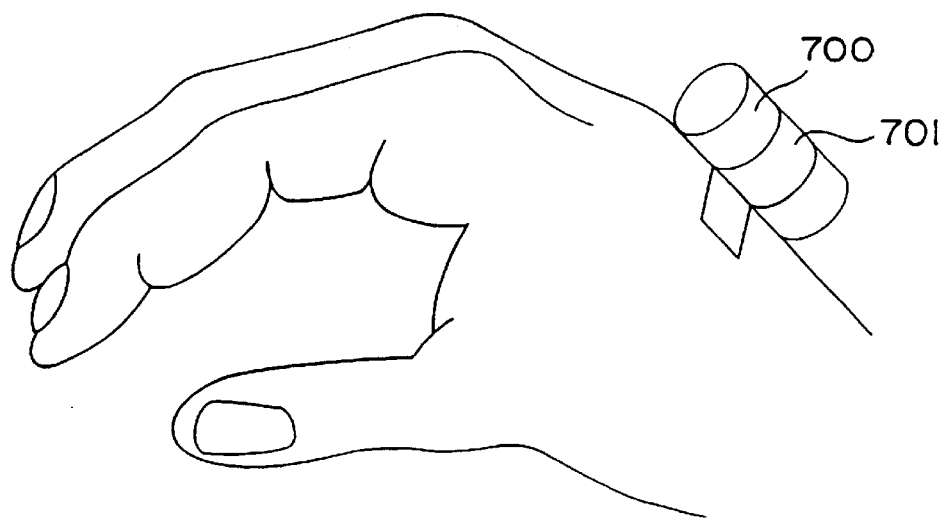
FIG. 7 is a perspective view of a vibrotactile unit attached to the dorsal side of the metacarpus (the back of the hand).

FIG. 7 illustrates another way of mounting the vibrotactile unit (700) onto the user using a fastening means (701). In this case the unit is positioned on the dorsal side of the metacarpus, or the back of the hand. Again, if a glove (instrumented or not) is worn, then the unit may also be mounted inside or outside of the glove in a pocket-like cavity, and need not be explicitly affixed to the hand.

Figure 8:
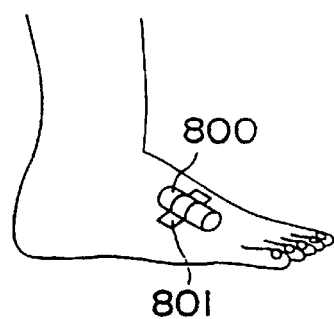
FIG. 8 is a perspective view of a vibrotactile unit attached to the top of the foot.

FIG. 8 illustrates another way of mounting the vibrotactile unit (800) onto the user using a fastening means (801). In this case the unit is positioned on the top of the user's foot If a sock-like garment (instrumented or not) is worn, then the unit may also be mounted inside or outside of the garment in a pocket-like cavity, and need not be explicitly affixed to the foot.

Figure 9:
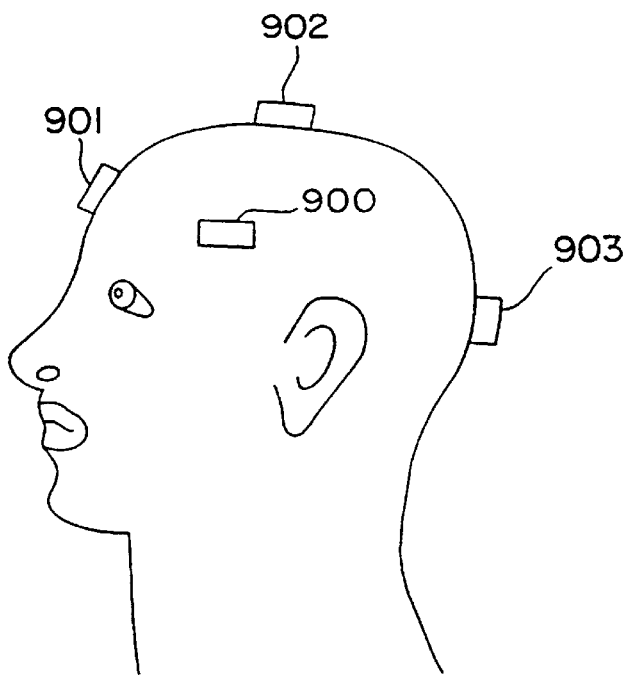
FIG. 9 is a side view of a multitude of vibrotactile units attached to a variety of places on the head.

FIGS. 9 illustrates another way of mounting vibrotactile units (900) onto the user. In this example, the units are positioned on the user's head. If a hat-like garment (instrumented or not) is worn, then the units may also be mounted inside or outside of the suit in pocket-like cavities, and need not be explicitly affixed to the body. Examples of locations include, but are not limited to, the temples (900), the forehead (901), the top of the head (902) and the back of the head (903).

Figures 10A, 10B:
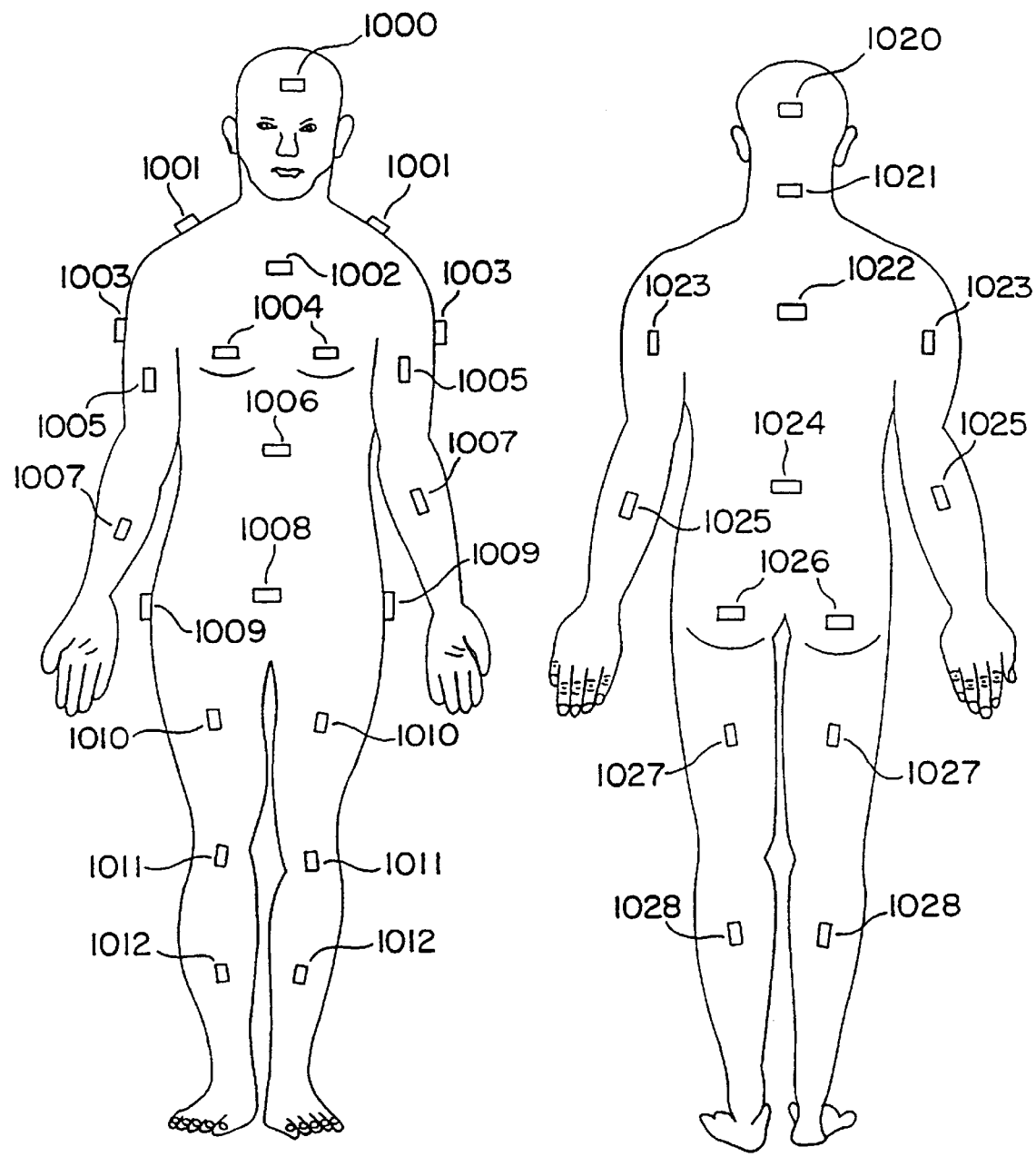
FIGS. 10a and 10b are front and back views respectively, of a multitude of vibrotactile units attached to a variety of places on the body.

FIG. 10a illustrates another way of fastening vibrotactile units (1000–1012) onto the user. In these examples the units are positioned all over the front and the side of the user's body. If a body suit (instrumented or not) is worn, then the units may also be mounted inside or outside of the suit in pocket-like cavities, and need not be explicitly affixed to the body. By actuating a combination of actuators, the perception of the localization of the tactile sensation may be controlled. For example, if the actuators on the forearm (1007) and on the humerus (1005) actuate with equal intensity, the user may have the perception that there is a single source of sensation originating in-between the two. This may apply to any combination of vibrotactile units located anywhere on the body. This effect is also apparent when multiple vibrotactile units are activated in sequence. There is a perception that a single vibration has "moved" between the activating vibrotactile units. The vibrotactile units displayed in the figure show examples of a variety of candidate positions for attaching the units. Some of these positions include, but are not limited to, the forehead (1000), the shoulders (1001), the side of the arm (1003), the humerus (1005), the chest (1002), the nipples (1004), the abdomen (1006), the forearm (1007), the groin (1008), the hips (1009), the thighs (1010), the knees (1011) and the shins (1012).

FIG. 10b illustrates another way of fastening vibrotactile units (1020–1028) onto the user. In these examples the vibrotactile units are positioned all over the back of the user's body. If a body suit (instrumented or not) is worn, then the vibrotactile units may also be mounted inside or outside the body suit in pocket-like cavities, and need not be explicitly affixed to the body. The vibrotactile units displayed in the figure show examples of a variety of candidate positions for attaching the units to the body. Some of these positions include, but are not limited to, the back of the head (1020), the base of the neck (1021), between the shoulder blades (1022), the back of the humerus (1023), the back of the forearm (1025), the lower back (1024), the buttocks (1026), the back of the thighs (1027) and the calves (1028). The vibrotactile units in FIG. 10b may be combined with those in FIG. 10a as well. This plurality of vibrotactile units shows one way that complex tactile sensations may be generated with multiple vibrotactile units.

Figure 11A:
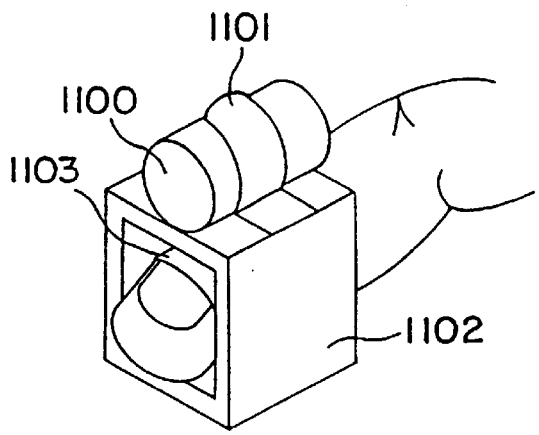
FIGS. 11a and 11b are perspective and front views respectively of a fastening means where the palmar side of the fingertip receives greater stimulation without the vibrotactile unit getting in the way of manipulation.
Figure 11B:
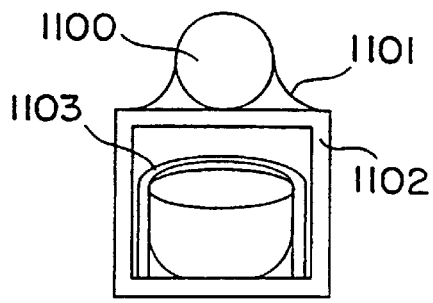

FIGS. 11a and 11b show a vibrotactile unit mounted in such a way that the fingertip may be stimulated without the unit getting in the way of manipulation with the fingers. FIG.

11a shows a perspective view of the invention and FIG. 11b shows a frontal view. A structure (1102), which may be opened or closed at the end, surrounds the fingertip. The fastening means is comprised of three parts: part one affixing the finger to the structure; part two affixing the vibrotactile unit to the structure; part three is the structure (1102). Part one of the fastening means (1103), which can be a flexible or rigid membrane, holds the finger against the structure on the palmar side of the fingertip. This part can be adjustable, fixed, flexible or stretchable. In part two, the vibrotactile unit (1100) is mounted atop the structure, away from the palmar side of the fingertip, using a means (1101) which can be a flexible or rigid membrane. In this manner, the vibrations from the vibrotactile unit may be transmitted trough the structure directly to the palmar side of the finger to provide a greater stimulation of the nerves local to the palmar side. In another embodiment, the structure (1102) and the vibrotactile unit casing (1100) can be made of one part, thus eliminating the need for a part two of the fastening means (1101).

Figure 12A:
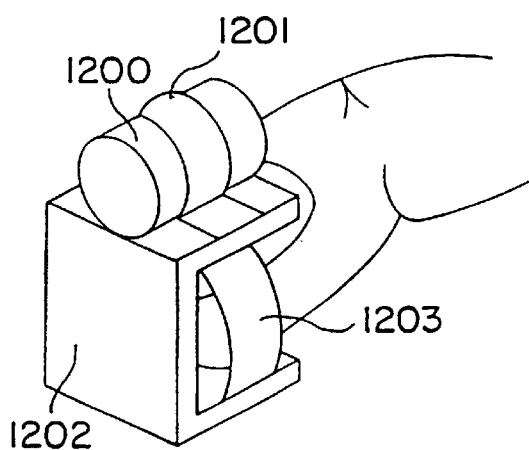
FIGS. 12a and 12b are perspective and front views respectively of a fastening means where the palmar side of the fingertip receives greater stimulation without the vibrotactile unit getting in the way of manipulation.
Figure 12B:
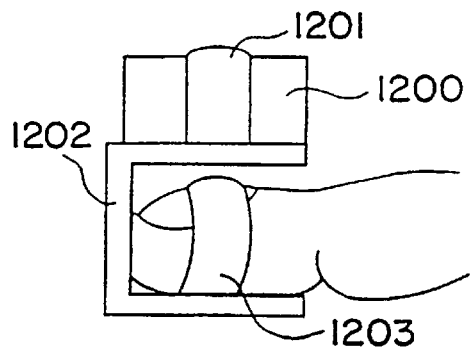

FIGS. 12a and 12b show the vibrotactile unit mounted such that the fingertip can be stimulated without the unit getting in the way of manipulation with the fingers. FIG. 12a shows a perspective view of the invention and FIG. 12b shows a side view. A structure (1202) is attached to the palmar side of the fingertip. The fastening means is comprised of three parts: part one, affixing the finger to the structure; part two, using the vibrotactile unit to the structure; part three which is the structure (1202). Part one (1203) may be a flexible or rigid membrane. This part may be adjustable, fixed, flexible or stretchable. In part two, the vibrotactile unit (1200) is mounted atop the structure, away from the palmar side of the fingertip, using a means (1201) which can be a flexible or rigid membrane. In another embodiment, the structure (1202) and the vibrotactile unit casing (1200) can be made of one part, thus eliminating the need for part two of the fastening means (1201).

Figure 13:
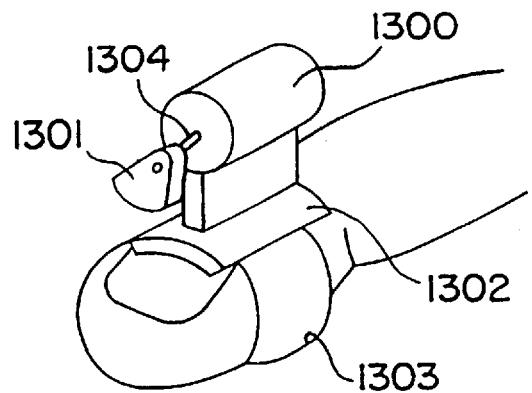
FIG. 13 is a perspective view of a fastening means where no casing is required for the vibrotactile unit because the moving mass is mounted away from the finger thus reducing the possibility of interference.

FIG. 13 shows a vibrotactile unit and fastening means where no casing is required for the mass-moving actuator/mass assembly. A small rigid or semi-rigid structure (1302) elevates the vibrotactile unit above the fingertip in such a way that the finger cannot interfere with the rotation of the eccentric mass (1301) about the main axis of the shaft (1304) of the mass-moving motor (1300). The structure (1302) is attached to the fingertip using a strap (1303) which can be rigid or flexible and which can be either an integral or separate part of the structure.

Figure 14:
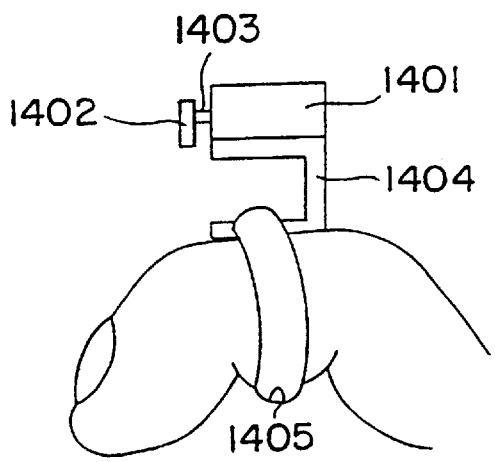
FIG. 14 is a side view of an another fastening means where no casing is required for the vibrotactile unit because the moving mass is mounted away from the finger thus reducing the possibility of interference.

FIG. 14 shows another vibrotactile unit and fastening means where no casing is required for the mass-moving actuator/mass assembly. A small rigid or semi-rigid structure (1404) elevates the vibrotactile unit above the middle phalanx in such a way that the finger cannot interfere with the rotation of the eccentric mass (1402) about the main axis of the shaft (1403) of the mass-moving actuator (1401). The structure (1404) is attached to the middle phalanx using a strap (1405) which can be rigid or flexible and which can be either an integral or separate part of the structure.

Figure 15:
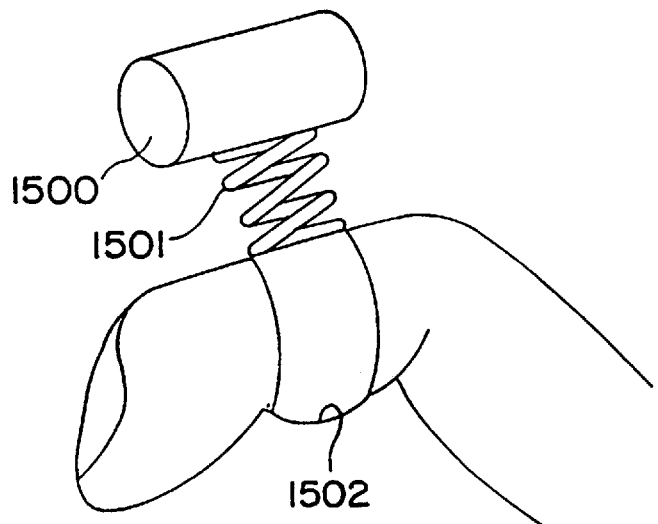
FIG. 15 is a perspective view of a fastening means where the vibrotactile unit is attached to the body via a spring that is used to alter the amplitude and frequency of the sensed oscillations.

FIG. 15 shows yet another vibrotactile unit (1500) and fastening means such that the vibrotactile unit is connected to the fingertip via a form of spring (1501) in order to alter the amplitude and frequency of the perceived vibrations. A strap (1502) which can be a flexible or rigid membrane holds the spring against the fingertip. The spring changes the natural frequency of the vibrotactile unit. Alternatively, the vibrotactile unit/spring apparatus could be attached below the finger instead of above it. The spring may also be replaced by some form of actuator to again control the amplitude and frequency and/or to extend the range of amplitude and frequency. In addition a damper may be introduced in combination with the spring or actuation system to further control and/or extend the amplitude and frequency of the perceived vibrations. An electro-rheological fluid may used in the damper to control the damping term in the mechanical system.

Figure 16A:
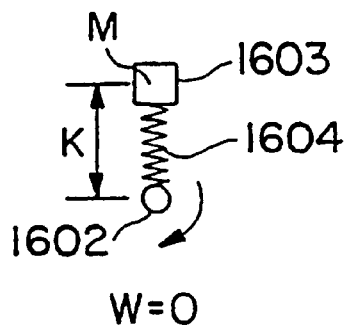
FIGS. 16a, 16b and 16c are front schematic views and 16d is a perspective view of a vibrotactile unit where the radius of the gyration of the eccentric mass increases as the angular velocity of the shaft increases.
Figure 16B:
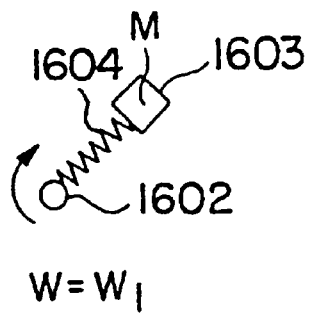
Figure 16C:
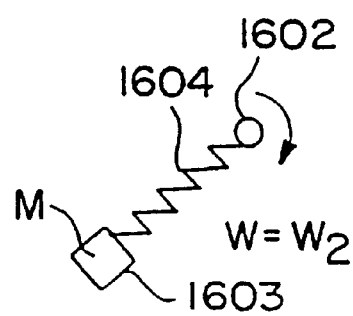
Figure 16D:
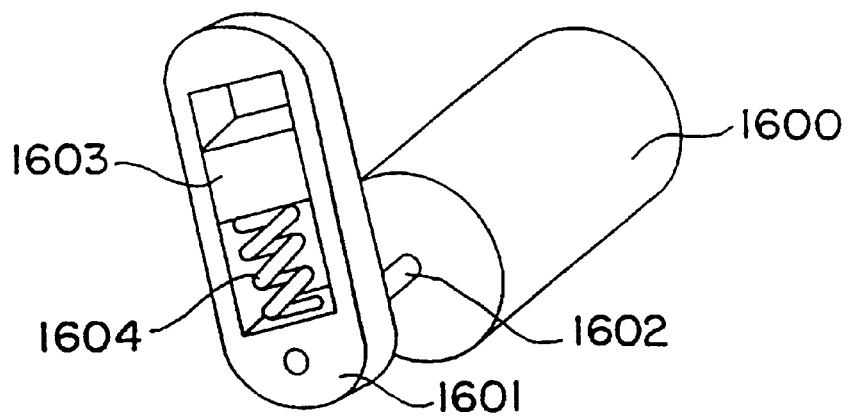

FIGS. 16a, 16b, 16c, and 16d illustrate a modification to the way the eccentric mass is mounted to a shaft. The radius of the gyration K of the eccentric mass increases as the angular velocity of the shaft increases. The top three drawings (FIGS. 16a, 16b, 16c) illustrate the principle, where $w_2 > w_1 > 0$, and the bottom perspective drawing (FIG. 16d) provides an implementation. In FIG. 16d, a structure (1601) is attached the shaft (1602) of the mass-moving actuator (1600). The structure comprises a spring (1604) and mass (1603) assembly. At one end, the spring is attached to the inside of the structure and at the other end it is attached to the mass. The mass is free to move towards and away from the shaft inside a guide in the structure. The radius of gyration K is the distance between the center of gravity of the mass (1603) and the main axis of the mass-moving actuator shaft (1602). As the angular velocity of the shaft increases, the centrifugal forces felt by the mass increase, causing it to stretch the spring further and increase the radius of gyration. This apparatus minimizes the angular inertia of the device at start-up and then gradually increases the eccentricity of the mass so that larger vibrations can be obtained at higher angular velocities. This relieves the stress on the bearings that hold the shaft and reduces the larger initial torque required to initiate rotation (as opposed to the torque required to maintain rotation). Alternatively, the passive spring may be replaced by an active device which controls or sets the radius of gyration of the mass. The active device may comprise a shape memory alloy actuator or any other mechanism capable of controlling the position of the mass.

Figure 17:
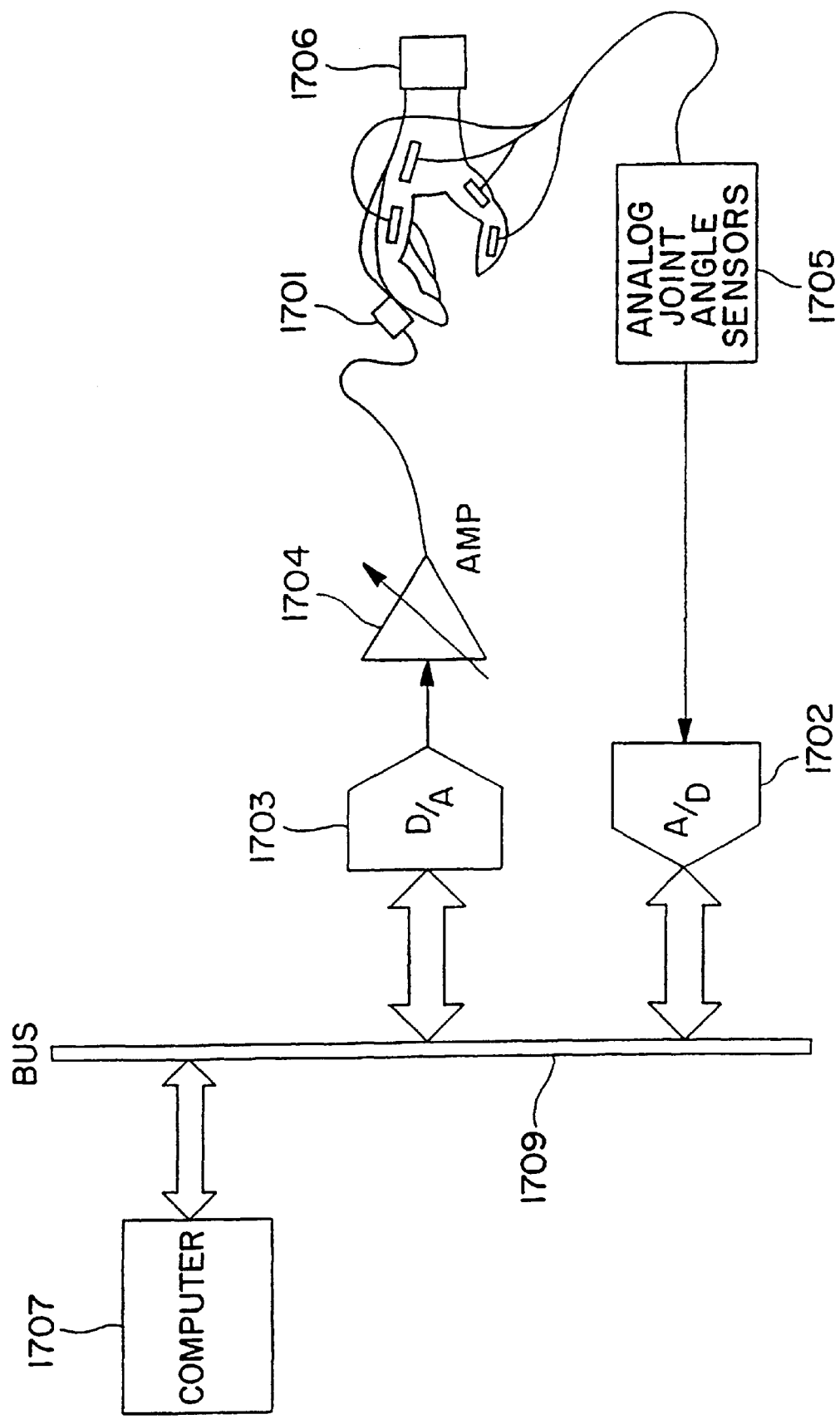
FIG. 17 is a schematic electrical-mechanical signal propagation diagram.

FIG. 17 shows how the electrical and mechanical signals propagate through the tactile feedback control system in a preferred embodiment of the invention The embodiment shown employs a d.c. servo motor (1701) as the mass-moving actuator of a vibrotactile unit. A computer (1707), or other signal processing means, sends a digital value representing the desired actuation level control signal to the digital-to-analog convert, D/A (1703). The analog output of the D/A is, then amplified by a variable gain amplifier (1704) to produce an analog voltage activation signal. This voltage is placed across the servo motor, driving the motor at a desired angular velocity. The voltage signal may alternately be converted to a current activation signal for driving the motor at a desired torque. Velocity damping of the servo control loop may be performed by tachometer feedback (not shown). The computer (1707), digital-to-analog converter (1703), analog-to-digital converter, A/D (1702), bus (1709) and variable gain amplifier (1704) may be elements of a signal processor. Digitized values from A/D (1702) from analog joint angle sensors (1705) provide the position information of the fingers (measured body parts) to the computer as a physical state signal. In a virtual environment application, the physical state signal may cause motion in a corresponding virtual hand. If one of the digits of the virtual hand is found to be intersecting a virtual object, the computer calculates the virtual force to be applied to the virtual digit using knowledge of the virtual object's shape and compliance. The computer then causes an activation signal to be sent to the vibrotactile units mounted on the user's fingers (sensing body part) to convey tactile information about that virtual force. Strain gage, fiber optic, potentiometric, or other angle sensors may be used as analog joint angle sensors (1705). Strain gage angle sensors are disclosed in the Kramer et al. U.S. Pat. Nos. 5,047,952 and 5,280,265, which patents are incorporated herein by reference.

Figure 18A:
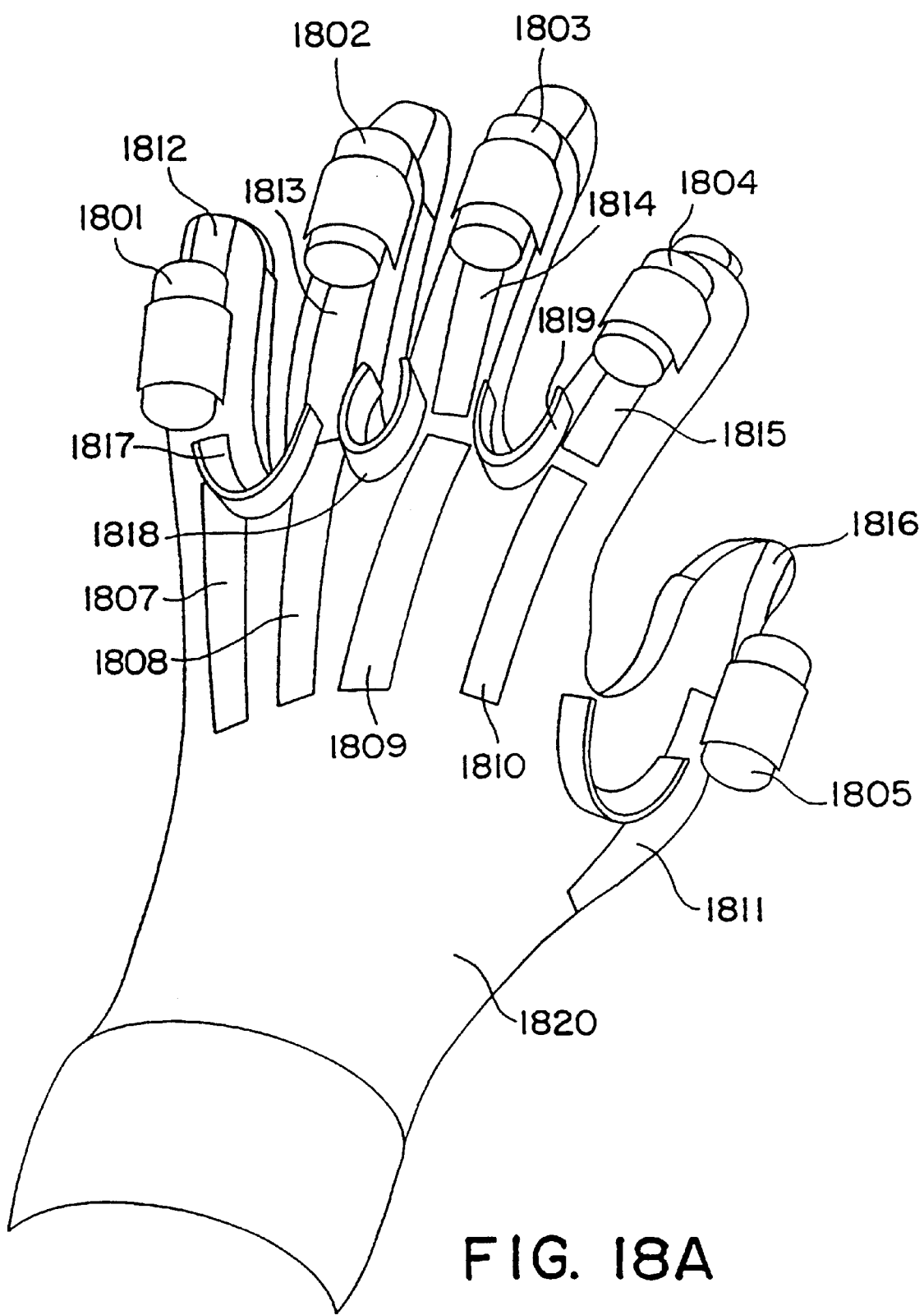
FIGS. 18a and 18b show an instrumented glove, in this case the Virtual Technologies CyberGlove™, with both position sensors and vibrotactile units.
Figure 18B:
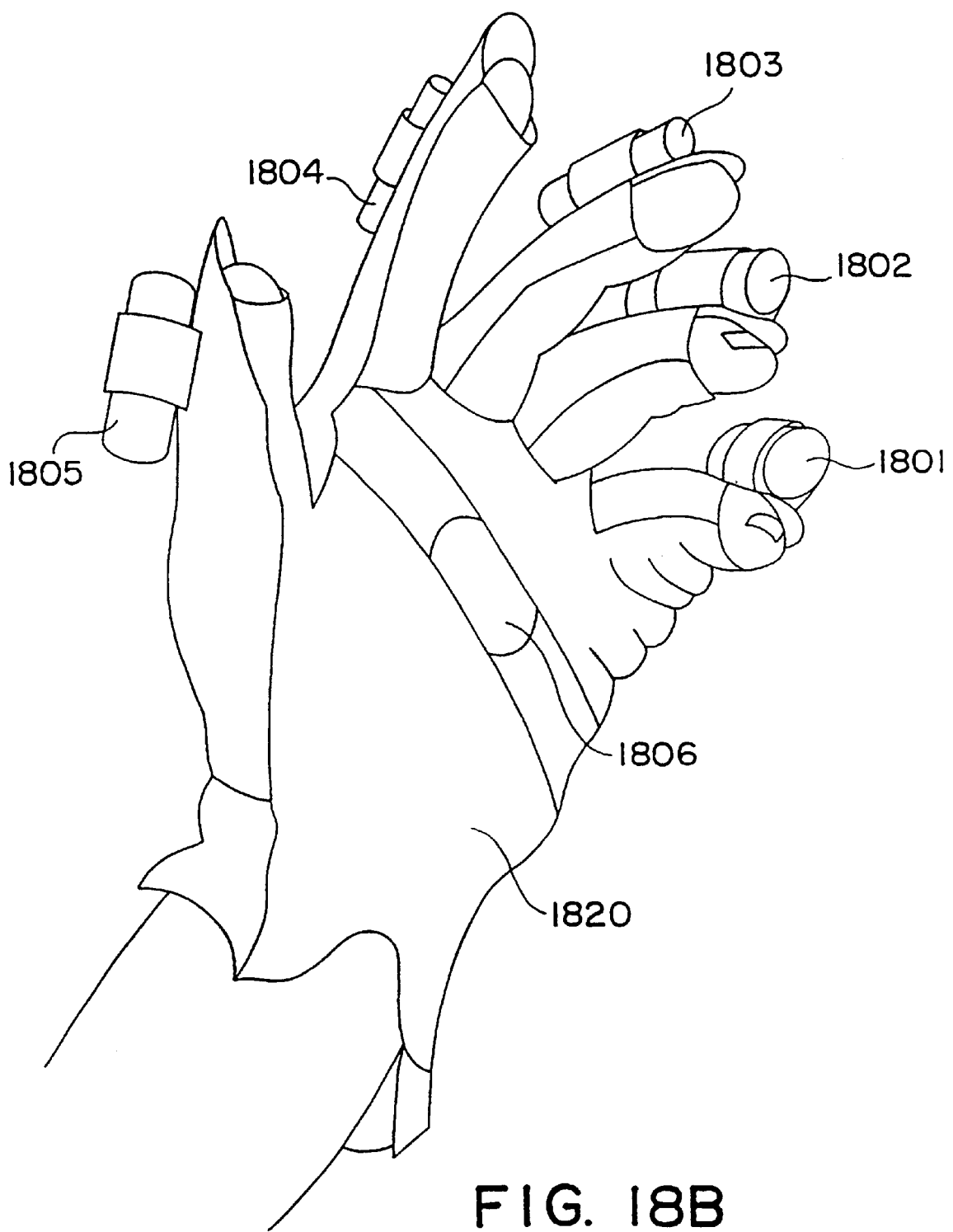

FIG. 18*a* and FIG. 18*b* illustrate a preferred embodiment of the invention. An instrumented glove (1820) such as the CyberGlove™ manufactured by Virtual Technologies of Palo Alto Calif., USA, has sensors (1807–1819) on it which measure the angles of the joints of the hand (the measured body parts). In the figures, the fingertips of the glove are open so that the user may handle physical objects while using the glove. This allows the user to feel the tactile sensations of real objects which may then be used in conjunction with tactile sensations generated from the subject invention. The vibrotactile units (1801–1806) are encased in cylindrical housings and fastened to the glove on each of the fingers (1801–1804), the thumb (1805) and on the palmar (1806) side of the hand. The vibrotactile units are composed of a d.c. motor (item 202 in FIG. 2) with an eccentric mass (item 201 in FIG. 2) mounted onto its shaft (item 204 in FIG. 2). The casing is made of tubular plastic and serves to protect the motion of the mass from the user and protect the user from the rotating mass.

Figure 19A:
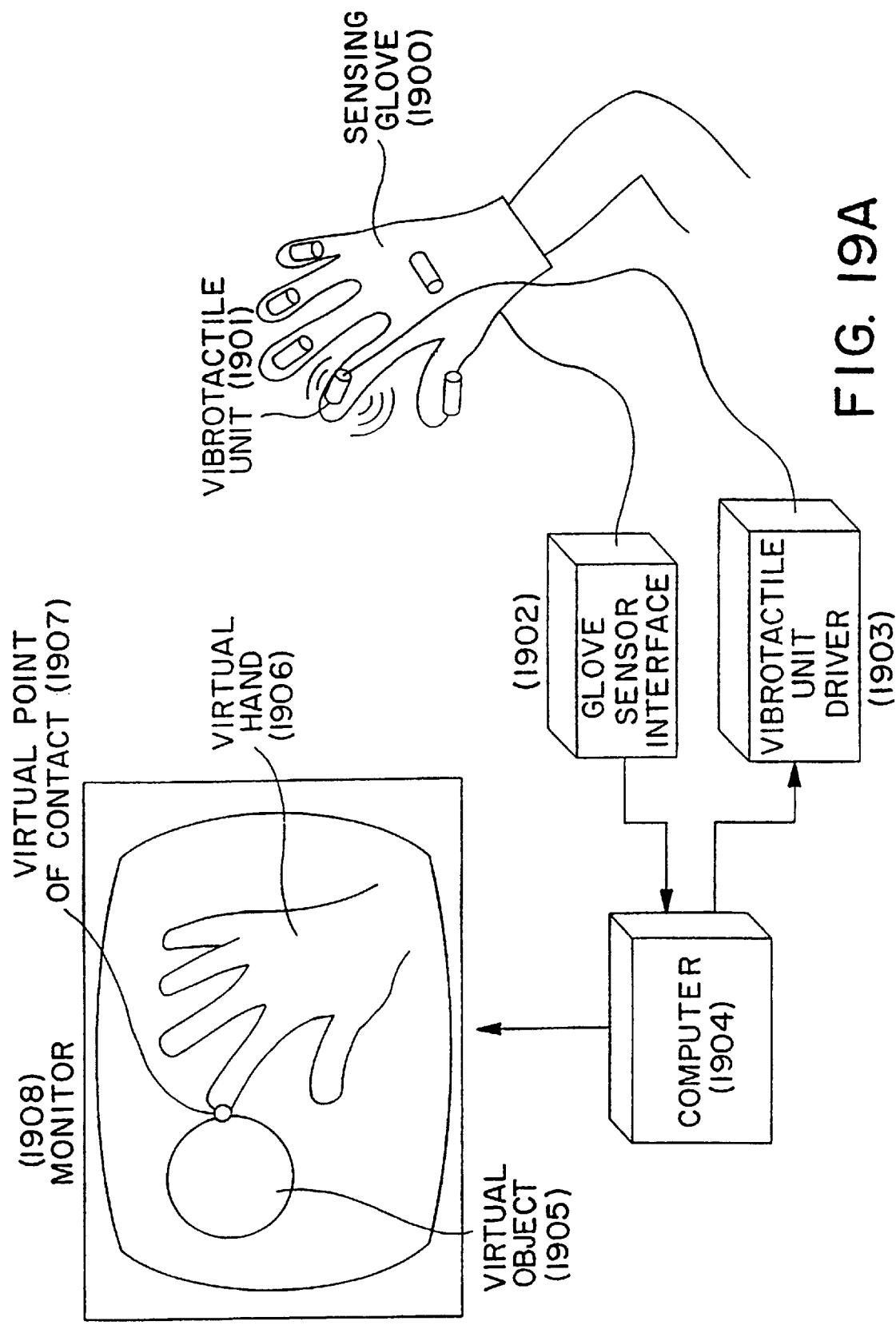
FIGS. 19a and 19b show schematically two applications using a sensing glove with vibrotactile units attached to the fingers and back of the hand.

FIG. 19*a* shows a user wearing a sensing glove (1900) which can measure hand formations as well as the spatial placement of the hand. The sensing glove has vibrotactile units (1901) fastened to the fingers and to the back of the hand. The user receives visual feedback through a graphical representation of his hand on the computer monitor (1908). The computer (1904) receives the state signal (information about the spatial placement of the user's hand) through the sensors mounted on the glove via a glove sensor interface (1902). When the viral graphical hand (1906) touches (1907) a virtual object (1905) on the monitor, the computer sends a control signal to the vibrotactile unit driver (1903) which then sends the activation signal to the vibrotactile units (1901).

Figure 19B:
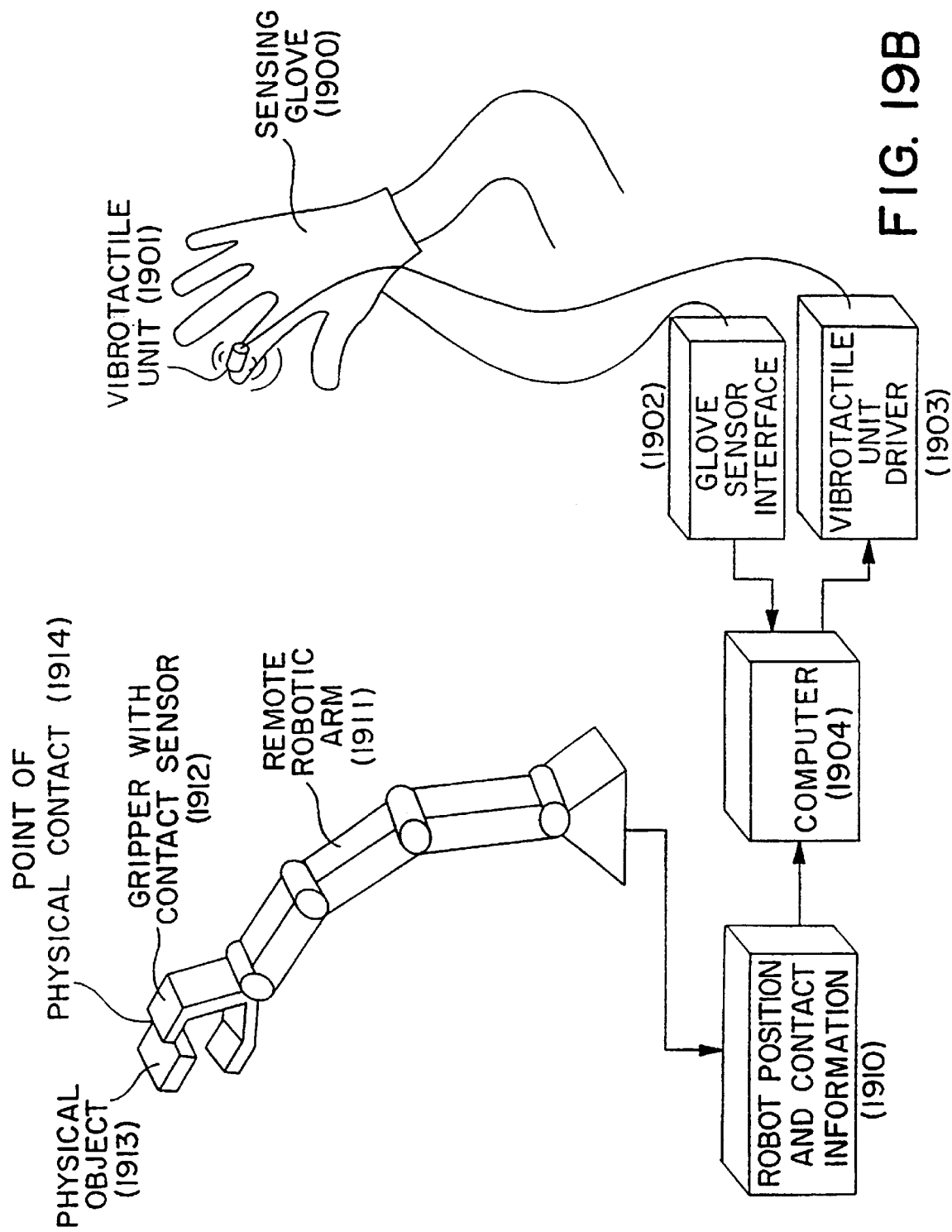

In a similar setup, FIG. 19*b* shows the same glove (1900) and computer interface remotely controlling a robotic arm (1911) instead of a graphic display. The robot has contact sensors on its gripper (1912) that detect when the robot touches physical objects (1913). The user controls the robot arm through the sensors on the glove which produce position readings of the fingers (measured body parts) which are sent to the glove interface device (1902) and then outputted to the computer (1904) which in turn sends the appropriate commands to the robot. Robot position and contact information (1910) is then fed back to the computer as the state signal. The computer interprets this signal and decides what kind of vibrational feedback should be sent to the vibrotactile unit (1901) (other vibrotactile units not shown) on the user via the vibrotactile unit driver (1903). Force or pressure sensors may be mounted on the gripper instead of contact sensors. The user then receives vibrational feedback of varying levels depending on the force or pressure on the object. This allows a teleoperator to perform tasks more efficiently and safely, especially in handling delicate objects that would break under certain grip forces. The user does not necessarily need to control the robot or the objects of contact in order to use the tactile feedback. The vibrotactile device may act simply to inform the user of contact with the object whether or not as a result of the user's actions.

Figure 20:
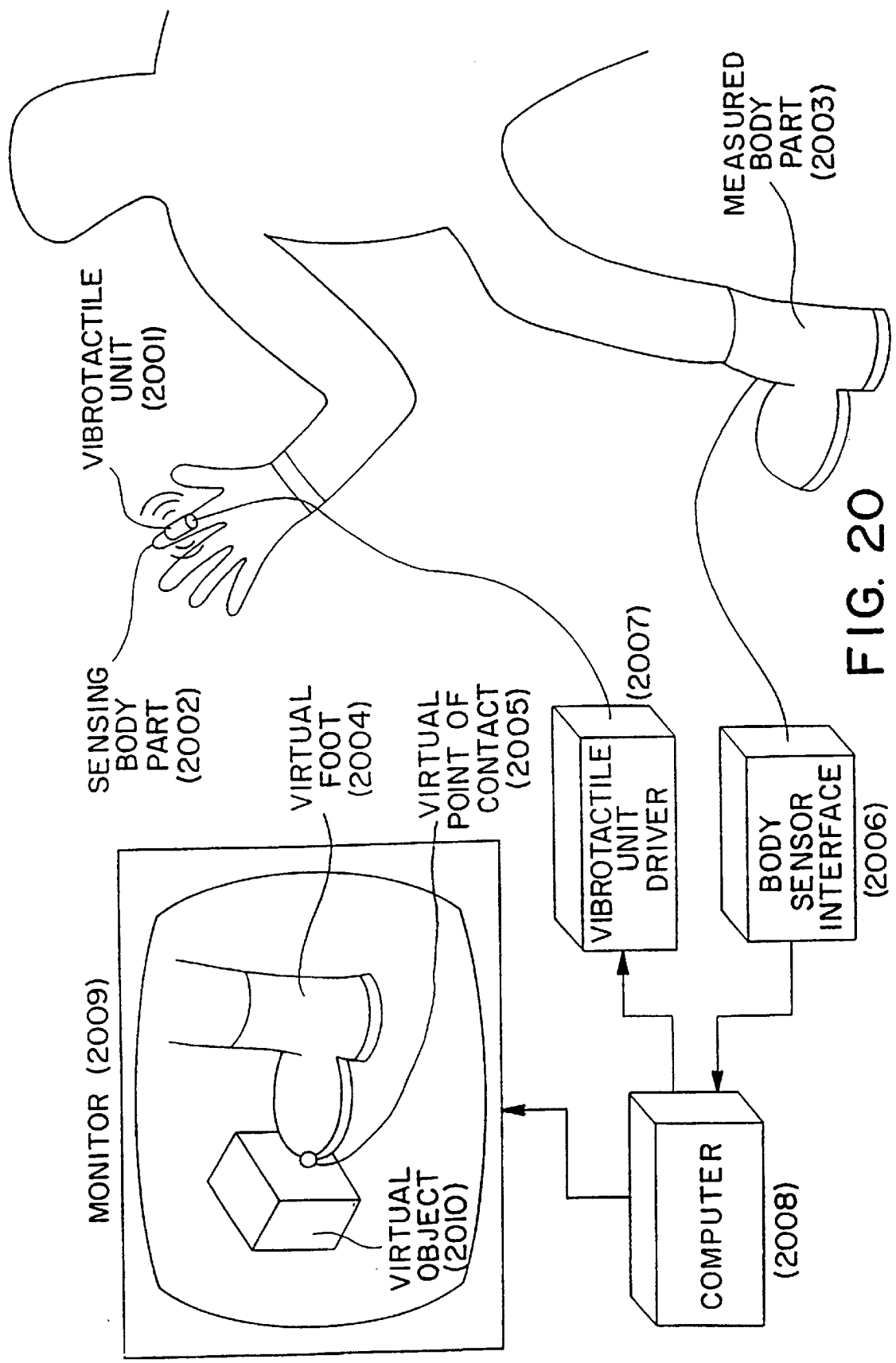
FIG. 20 illustrates schematically an example of a virtual environment with separate sensing and measured body parts.

FIG. 20 illustrates an embodiment in a virtual reality context where the measured body part (2003) is the foot, however, the vibrotactile unit (2001) is mounted on the finger which acts as the sensing body part (2002). The foot has a graphical object (2004) associated with it in the computer simulation. In this case, the graphical object looks like a foot as well. Motions of the foot are sent to the computer (2008) via the body sensor interface (2006) and are reflected on the computer monitor (2009). When the computer (2008) determines that the graphical foot (2004) contacts a virtual object (2010), the computer interprets this state signal and sends a control signal to the vibrotactile unit driver (2007) to activate the vibrotactile unit (2001) on the finger. This may be due to the user moving his foot so that the graphical foot contacts (2005) the virtual object, or the virtual object moving into the graphical foot independent of the user's actions. The user then needs to correlate the contact of the virtual object with the sensation at the fingertip. While this does not seem as natural as vibrating the foot as it makes contact, this illustrates the sensing body part separate from the measured body part. This is necessary if the measuring body part cannot coincide with the sensing body part, for example if the measured body part is the eye-ball or if the measured body part is on another user.

Figure 21A:
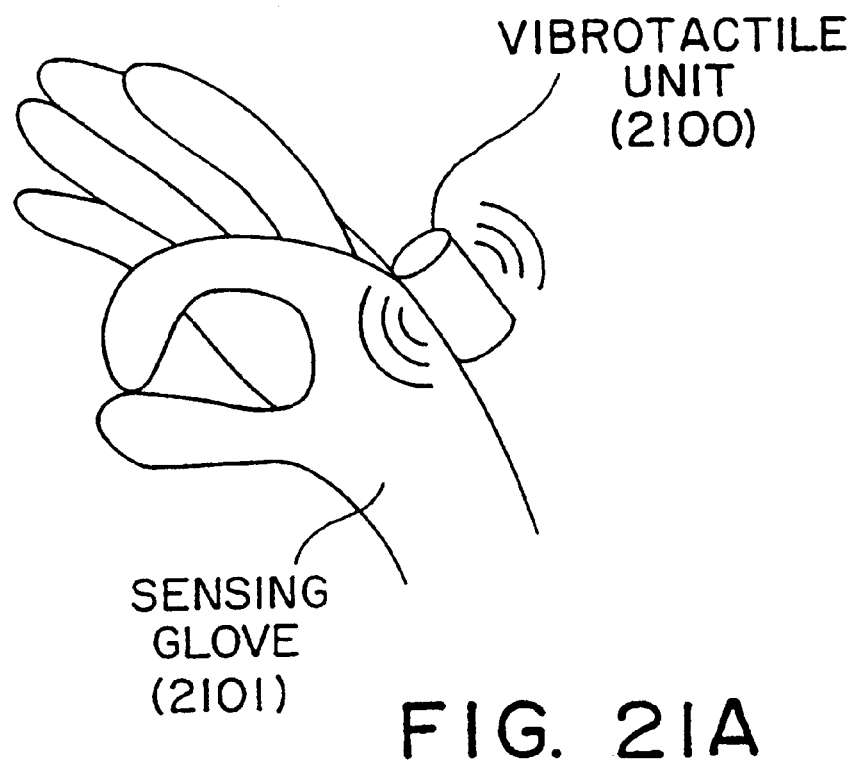
FIGS. 21a and 21b are perspective drawings showing two applications of the invention for gesture recognition.
Figure 21B:
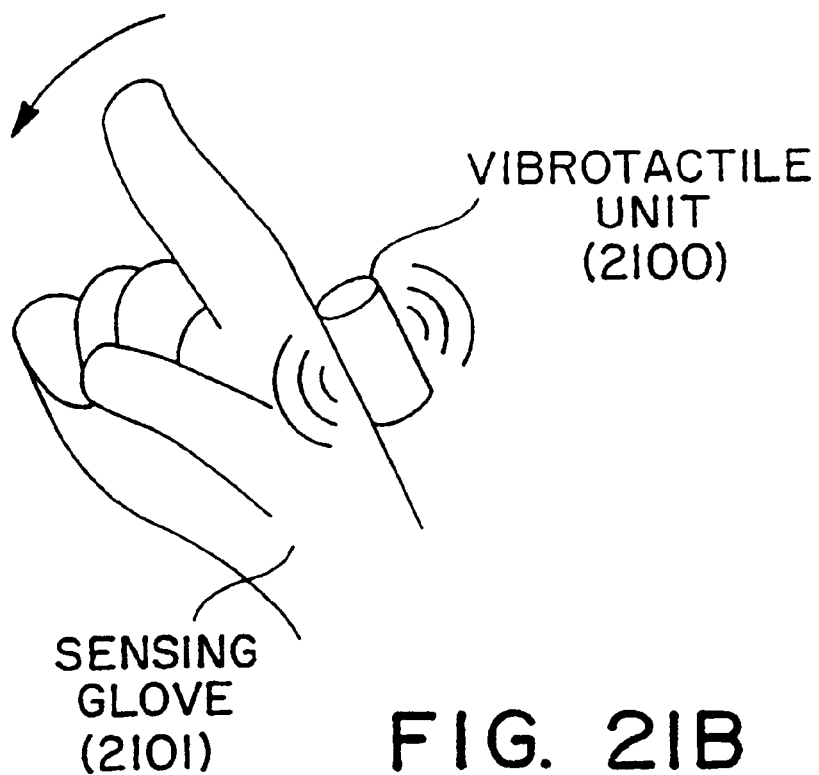

FIG. 21*a* and FIG. 21*b* illustrate a glove (2101) which contains both position sensors and vibrotactile units (2100). The Virtual Technologies CyberGlove™ is an example of a glove with appropriate position sensors. The sensors measure the spacial placement of the hand and fingers. A computer uses gesture recognition software to determine if a pre-specified hand formation or motion has been gesticulated. In FIG. 21*a*, the vibrotactile unit signals the user that a particular static pose has been detected. A different vibrotactile sensation can be generated in response to a recognized moving hand or arm gesture that includes dynamic motions (FIG. 21*b*). This may also be useful in training the gesture recognition software for the gestures to be recognized. In training the software, a user must repeatedly make the same gesture to obtain some sort of average position since humans cannot repeat gestures exactly. With the vibrotactile feedback, the user may be trained to better repeat his gestures while at the same time training the recognition software to recognize his gestures. Better repetition of the gestures reduces the statistical distribution of the sensor readings for a given hand gesture which in turn may improve the performance of the recognition system.

Figure 22:
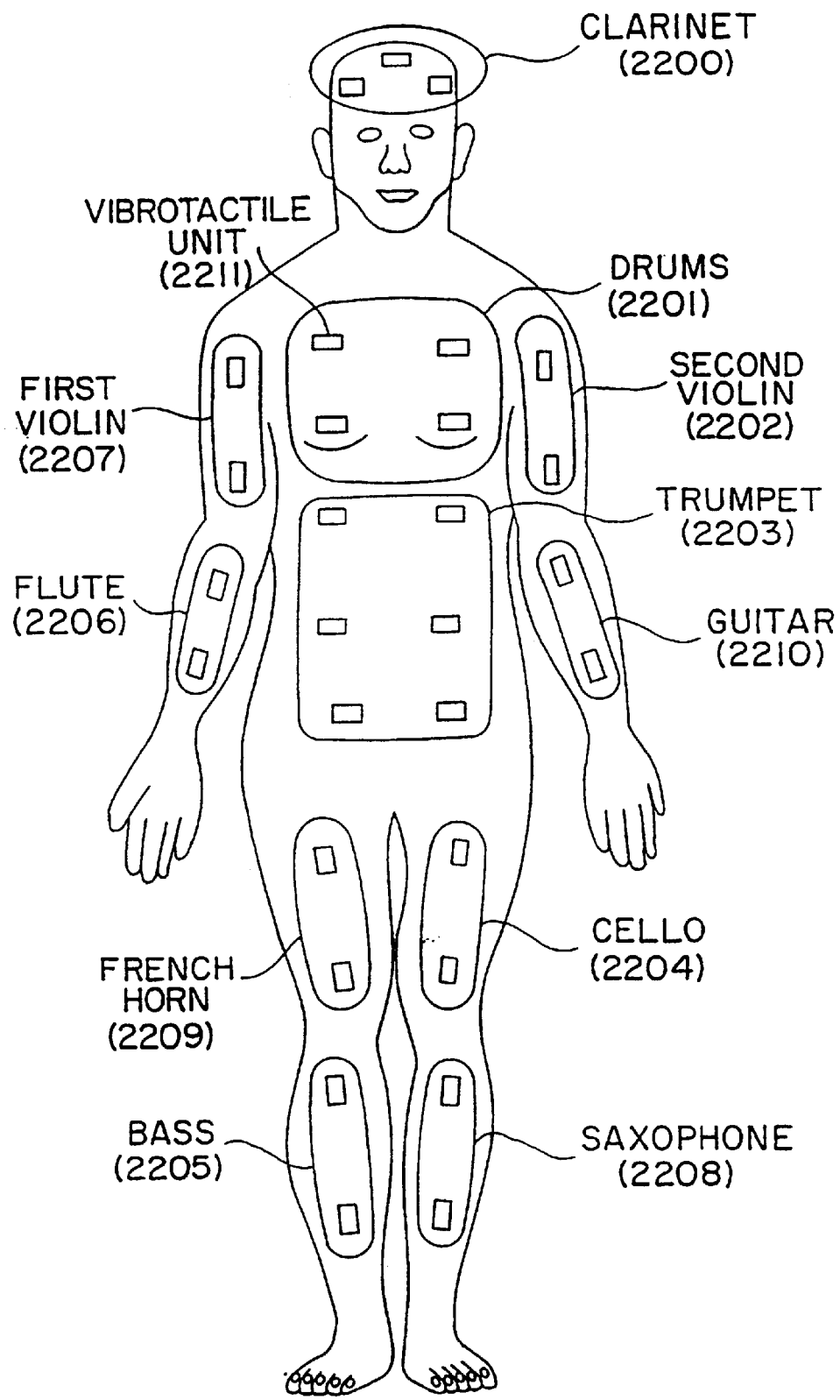
FIG. 22 is a schematic drawing showing a musical application.

FIG. 22 illustrates vibrotactile units in a musical application. The units are attached to a body suit or mounted directly onto the user's clothing. Different regions on the body (2200–2210), which contain groupings of vibrotactile units (2211), may correspond to different musical instruments in an orchestra and serve to enhance the musical experience. For example, music produced by a cello produces proportional vibrations on the user's thigh (2204) through the vibrotactile units located in that body region. Similarly, the drums induce vibrations in the units that stimulate the chest area (2201) and so on. Sections of the body containing multiple vibrotactile units corresponding to one instrument type may have individual vibrotactile units corresponding to individual instruments. For example, the cello section of the body is shown to have the first chair cello on the upper thigh, and the second chair cello on the lower thigh. The user may either be a passive listener "feeling" the instruments as well, or he may be an active participant in creating the music, receiving the vibrotactile sensations as feedback.

FIG. 23 illustrates an entertainment application. In this case an array of vibrotactile units simulates water flow or wind. In this illustration a user is lying on a couch (2300) and is immersed in a virtual beach scene and sees the beach through a head-mounted display (2302). The user hears ocean sounds through head-mounted earphones (2301) and feels warmth from the sun through heat lamps (2303). The user then feels wind simulated by the vibrotactile units as they are pulsed in sequence creating "waves" of sensation. For example, the wind could flow from head to toes by alternatively pulsing the vibrotactile units starting with the ones on the head (2304) and ending with the ones on the toes (2305). Similarly, water is felt as pulsed waves (although perhaps of larger amplitude), as the user swims through the virtual water. In this fashion, the user may be relaxed or entertained.

FIG. 24a and FIG. 24b illustrate a medical application where, for example, a user has injured a knee. A vibrotactile unit (2401) is used in conjunction with bend sensors (2400) mounted on the knee during physical therapy sessions as shown in FIG. 24a. The vibrotactile unit notifies the user when the knee is exercised appropriately and alerts the user if the knee is flexed further than a safe limit prescribed by a doctor and thus improve recovery as is illustrated in FIG. 24b. Furthermore, the vibrotactile units, in conjunction with other sensors, may be used in any biofeedback application.

Figure 25A:
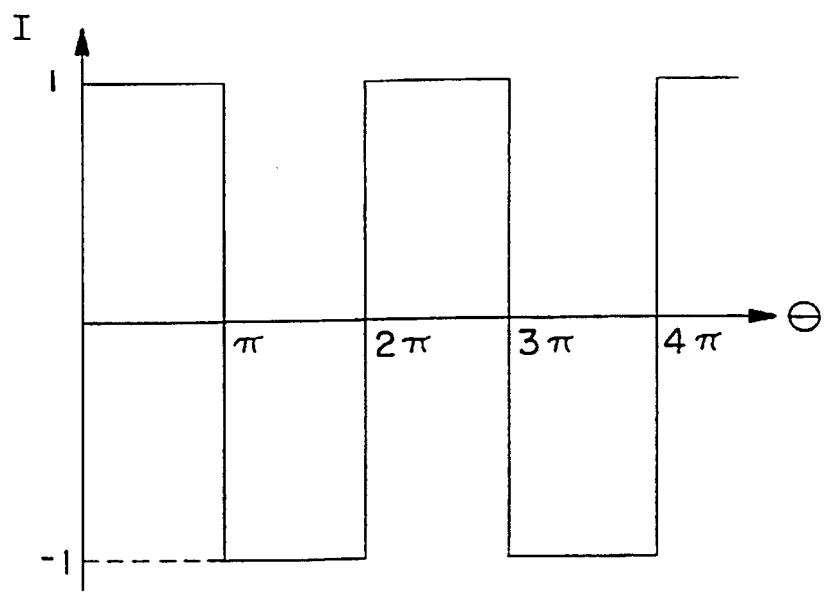
FIGS. 25a, 25b and 25c are a schematic drawings illustrating an amplitude decoupling method.
Figure 25B:
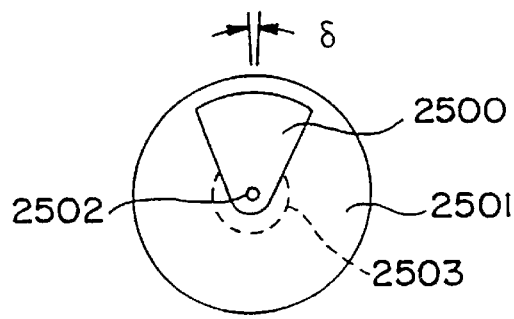
Figure 25C:
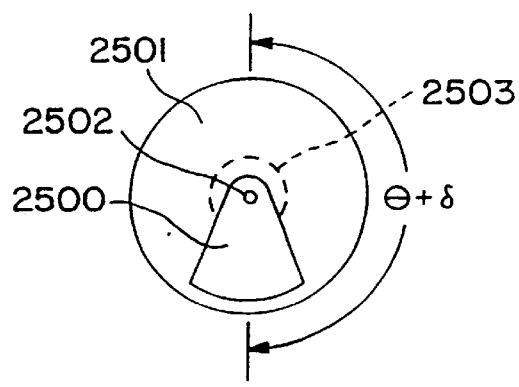

FIGS. 25a, 25b and 25c illustrate an approach for decoupling the amplitude and frequency components of the vibrations generated by an eccentric mass-based vibrotactile unit. In this embodiment, the vibrotactile unit comprises a rotary electric motor (2501), a mass mounted eccentrically (2500), a sensor (2503) mounted on the shaft (2502) to determine the angular position of the shaft and a closed-loop control system. Any other control law may be used that achieves a single rotation of the shaft. One example is shown in FIG. 25a. The vertical axis of the graph represents a normalized current, the horizontal axis represents the rotation of the axis in radians. This corresponds to the following non-linear control law:

$$I=1, (\delta \geq \theta > \pi)$$

$$I=-1, (\pi \geq \theta \geq 2\pi - \delta)$$

$$I=0, (-\delta > \theta > \delta)$$

With the initial conditions set so that the velocity is zero and rotational position of the mass, θ, (in radians) is equal to a small value, δ, (FIG. 25b) sending current, I, to the motor in this manner would cause the mass to accelerate for half of a full rotation, up to θ+δ (FIG. 25c), and decelerate for the other half of the rotation coming to a stop between the −δ and +δ position in the ideal case. The actual position of the −δ and the +δ position may have to vary depending on the bandwidth of the control loop and the friction and damping of the system. The magnitude of vibration or impulse is set by the amplitude of the current, the frequency is set by repeating the above control at the desired frequency. A simple feedback control loop (PID for example) could ensure the initial conditions are correct before each pulse. The details of this are common knowledge to those skilled in the art.

Figure 26A:
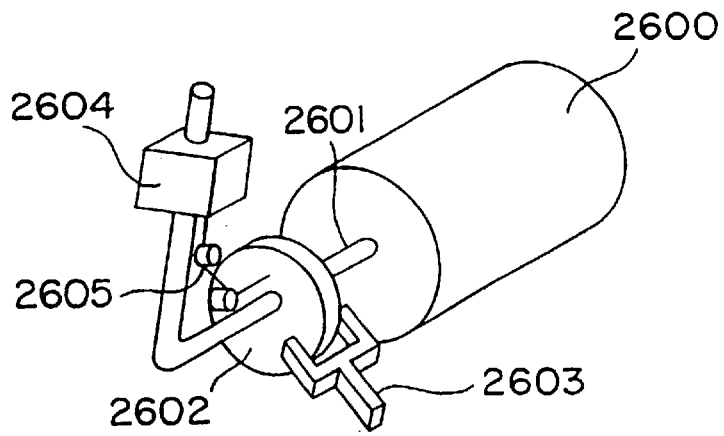
FIG. 26a is a perspective drawing and FIG. 26b is a side view of a vibrotactile unit with a controllable eccentricity.
Figure 26B:
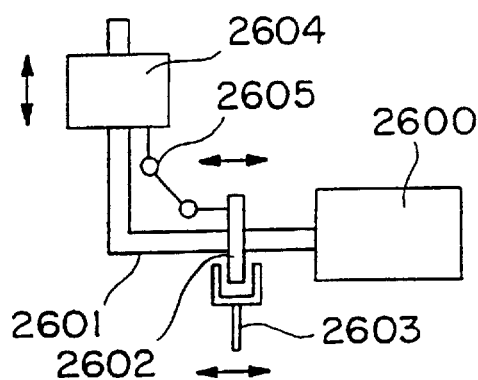
Figure 26C:
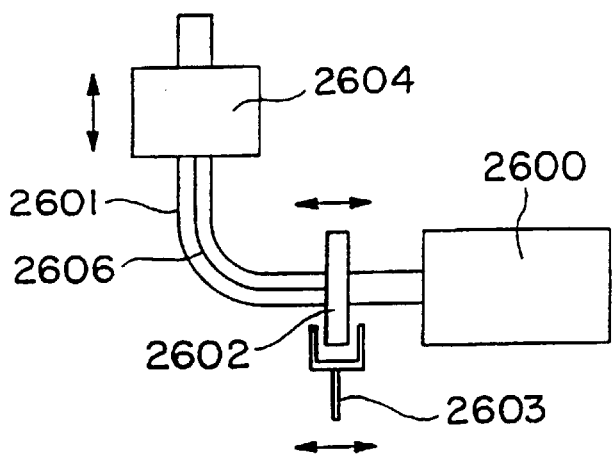
FIG. 26c is an alternative transmission method that can be used to control the eccentricity of the mass.

FIG. 26a is a perspective drawing and FIG. 26b is a side view of a vibrotactile unit with controllable eccentricity. A structure, such as a slip-disk (2602), is mounted on the shaft (2601) and is free to slide back and forth along the shaft. The slip-disk is attached to a linkage (2605) which connects it to the eccentric mass (2604). A positioning device (2603) controls the position of the slip-disk on the shaft, which in turn affects the position of the mass (via the linkage) and thus its eccentricity. FIG. 26c is an alternative transmission method that can be used to control the eccentricity of the mass. In FIG. 26c, the transmission comprises element (2606), which may be a flexible membrane or fluid inside a hollow shaft (2601) that is connected to the eccentric mass (2604) at one end and the sliding slip-disk (2602) at the other. Again, controlling the position of the disk along the shaft using the positioning device (2603) affects the eccentricity of the mass. Element 2606 may also be a fluid and 2604 a hollow container. As the fluid is forced through the tube (2601) by the slip-disk (2602), or by some other pressure generating means, the container (2604) is filled with the fluid, thus increasing the effective radius of gyration of the center of mass of the fluid. By increasing the radius of gyration, by whichever means, it is possible to independently control the amplitude and frequency of vibration of the vibrotactile unit.

Figure 27:
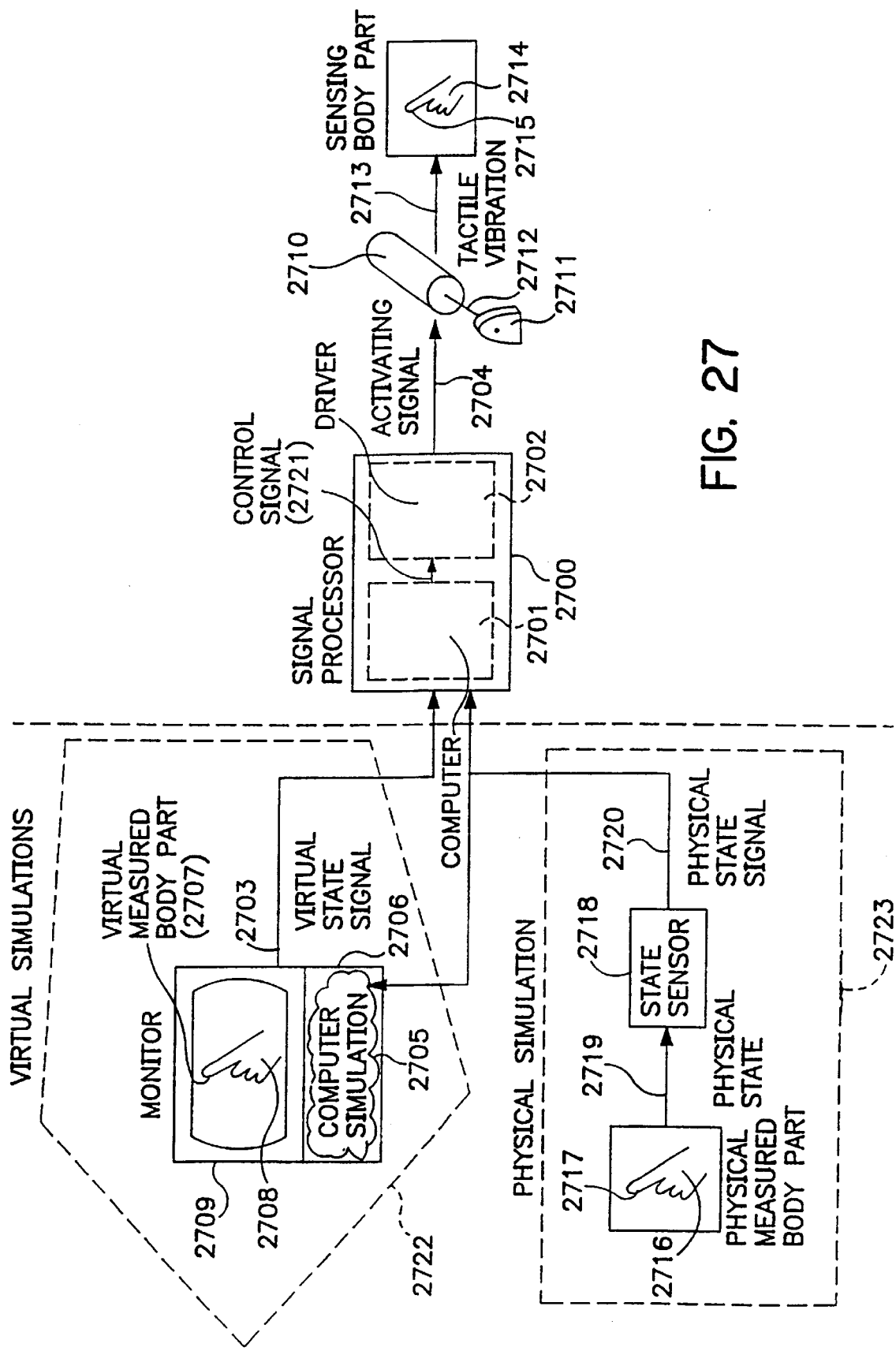
FIG. 27 is an exemplary diagrammatic view of an application comprising the vibrotactile device, a virtual simulation and a physical simulation.

FIG. 27 provides an exemplary block diagram of the components and functional relationship between the components comprising the vibrotactile device when used in an application. Although some components are shown interrelated with a unidirectional arrow, the arrows may be bidirectional to provide bidirectional flow of information. Additional arrows may be added between blocks to provide for communication between components. An application may include presenting vibrotactile sensation to a body part of a user, where the vibrotactile sensation is associated with a virtual environment simulation (virtual simulation) and/or the physical state of a body (physical simulation), which may be the user's body, or another person's body. One or more virtual simulations may co-exist with one or more physical simulations, and may be combined with further types of simulations to yield a vibrotactile sensation.

The exemplary virtual simulation (2722) of FIG. 27 comprises a computer (2706) with computer monitor (2709). To produce the virtual simulation, the computer typically generates, processes, executes or runs a computer simulation (2705) which is typically in the form of a computer software program. In the exemplary virtual simulation, the computer produces a graphical display of a virtual measured body part on the monitor, where the body part is shown to be a fingertip (2707) on a virtual hand (2708). The virtual simulation may internally generate an internal state with a variety of state variables which comprise a virtual state signal (2703) to provide to a signal processor (2700). Exemplary virtual state variables include position, velocity, acceleration, mass, compliance, size, applying force or torque, composition, temperature, moisture, smell, taste and other dynamical, structural, physical, electrical metabolical, moodal, cognitive, biological and chemical properties of various portions internal to, and on the surface of, a virtual measured body part. States variables may also denote functions of state variables, such as contact of various parts of the virtual hand.

FIG. 27 also provides an exemplary physical simulation (2723) comprising a state sensor (2718) and a physical measured body part (2717). In this example, the physical measured body part is depicted as a fingertip (2717) on a physical hand (2716). The state sensor measures the physical state (2719) of the physical measured body part and produces a physical state signal (2720) to provide to the signal processor (2700). The physical state signal (2720) is optionally provided to the computer (2706) and/or computer simulation (2705) of a virtual simulation (2722). Exemplary physical state variables include position, velocity, acceleration, mass, compliance, size, applying force or torque, composition, temperature, moisture, smell, taste and other dynamical, structural, physical, electrical, metabolical, moodal cognitive, biological and chemical properties of various portions internal to, and on the surface of, a physical measured body part. States variables may also denote functions of state variables, such as contact of various parts of the physical hand.

As shown in FIG. 27, for both the virtual simulation and the physical simulation, the signal processor (2700) receives a state signal and produces an activating signal (2704). For the virtual simulation, the state signal is the virtual state signal (2703); for the physical simulation, the state signal is the physical state signal (2720). When the application comprises both a virtual simulation and a physical simulation, both a virtual state signal and a physical state signal may be presented to the signal processor.

The signal processor may employ a digital or analog computer (2701) to interpret one or more input state signals (e.g., a virtual or physical state signal) and produce a control signal (2721) which becomes the input signal to a driver (2702). Using the control signal, the driver produces the activating signal (2704). When the computer is absent from the signal processor, the driver determines the activating signal from the state signal or signals. Whether or not the computer is present in the signal processor, the activating signal is provided in a form for use by the mass-moving actuator (2710). For example, the driver may comprise a motion control module, an operational amplifier, a transistor, a fluidic valve, a pump, a governor, carburetor, and the like. In the case where the mass-moving actuator is an electric motor, the activating signal may be a voltage or current with sufficient electrical power or current drive to cause the motor to turn.

In FIG. 27, the mass-moving actuator (2710) is shown to be an electric motor which turns a shaft (2712) and an eccentric mass (2711). As the mass is rotated, the entire assembly of 2710, 2711 and 2712 vibrates, producing vibrations (2713). Such vibrations are transmitted to a sensing body part of a user who perceives a tactile sensation. In the figure, the sensing body part is exemplified as the fingertip (2715) of a hand (2714).

An exemplary application which comprises a virtual simulation and a physical simulation is summarized as follows:

A fingertip of a physical hand corresponds to both the sensing body part (2715) and the physical measured body part (2717). An instrumented glove, optionally comprising a joint angle sensor and spatial position sensor, produces a physical state signal (2720) corresponding to the position of the physical fingertip. The fingertip position is provided via a wire (e.g., electrical or optical), computer bus or other electrical or optical connecting means to a computer (2706) running a computer simulation (2705) in software. The fingertip position is often provided in the form of digital values, typically as joint angles and/or values corresponding to the six possible spatial degrees of freedom. The fingertip position may also be in the form of an analog voltage.

The computer simulation uses the physical state signal (2720) corresponding to the physical fingertip position (2719) to simulate the position and motion of a virtual hand (2708) and fingertip (2707). The computer simulation displays the virtual hand on a computer monitor (2709), in addition to displaying a second virtual object whose attributes may correspond to a second physical measured object, such as a block, ball, car interior, engineering part, or other object. The computer monitor may be a desk-top monitor, head-mounted monitor, projection monitor, holographic monitor, or any other computer generated display means. The second physical measured object may also be a body part of the user or a second user.

When the user moves his hand, producing a movement of the virtual hand, the computer simulation detects a level of virtual contact between the virtual fingertip (2707) and the second virtual object. The computer simulation then produces a virtual state signal (2703) where one state variable denotes the level (e.g., amount of force) of the virtual contact of the virtual fingertip. The virtual state signal is transmitted to the signal processor (2721) via a wire (e.g., electrical or optical), computer bus or other electrical or optical connecting means. The signal processor may exist in the computer (2706), in which case the virtual state signal is typically transmitted via the computer bus. When the signal processor exists in a separate enclosure from the computer, the virtual state signal is typically transmitted via a wire.

The signal processor may convert the state variable level of virtual contact into an activating signal voltage proportional to the level of virtual contact force using a digital-to-analog converter followed by an operational amplifier. The voltage is presented to the mass-moving actuator (2710) typically by a wire (e.g., electrical or optical) or other electrical or optical connecting means. The mass-moving actuator may be a variable speed electric motor which spins eccentric mass (2711) on its shaft (2712). The electric motor with eccentric mass are housed in a plastic housing or casing which is affixed to the dorsal portion of the instrumented glove surrounding the fingertip, which fingertip corresponds to both the physical measured body part and the sensing body part The affixing is typically done with straps, sewing, gluing and the like. As the eccentric mass rotates, the electric motor, mass, casing and sensing body part all vibrate, typically at a common frequency. Ideally, there is little vibrational attenuation between the mass and the sensing body part such that as the eccentric mass rotates, the electric motor, mass, casing and sensing body part all vibrate with the same amplitude.

In the application just described, the user may perceive a cause-and-effect relationship between motion of his fingertip and the level of vibration he feels. Thus, the position, compliance, mass, shape and other attributes of a virtual object may be detected by movement of the user's fingertip, or by movement of the virtual object, inducing various vibrotactile responses. The vibrotacdle device of the subject invention promotes a sensation of immersion in a virtual environment where the user is able to interact with virtual objects as if he were interacting with physical objects in a physical environment.

Any publication or patent described in the specification is hereby included by reference as if completely set forth in the specification.

While the invention has been described with reference to specific embodiments, the description is illustrative of the invention and is not to be construed as limiting the invention. Thus, various modifications and amplifications may occur to those skilled in the art without departing from the true spirit and scope of the invention as defined by the appended claims.

What is claimed is:

1. A system for providing a tactile sensation to a sensing body part in relation to a variable state signal, said system comprising:
   means for generating said variable state signal;
   a mass-moving actuator comprising a shaft and an eccentric mass mounted on said shaft for transmitting vibrations to said sensing body part, said mass moving actuator rotating said shaft; and
   a signal processor for receiving and interpreting said state signal to produce an activating signal and transmitting said activating signal to said mass-moving actuator for activating said mass-moving actuator to produce a variable tactile sensation in relation to said variable state signal as a result of varying the frequency and amplitude of said vibration.

2. A system according to claim 1, wherein said activating signal provides varying levels of activating said mass-moving actuator for varying the rotation of said shaft.

3. A system according to claim 1, wherein said mass-moving actuator is an electric motor and said apparatus comprises electrical connection means connecting said electric motor to said signal processor.

4. A system according to claim 1, wherein said eccentric mass is pie-shaped.

5. A system according to claim 1, comprising a plurality of mass-moving actuators.

6. A system according to claim 1 further comprising a casing containing said mass-moving actuator.

7. A system for providing a tactile sensation to a sensing body part, said system comprising:

means for generating said variable state signal;

a plurality of mass-moving actuators, each of said actuators comprising a shaft and an eccentric mass mounted on said shaft for transmitting vibrations to said sensing body part, each of said mass moving actuators rotating said associated shaft; and a signal processor for receiving and interpreting said state signal to produce multiple activating signals and transmitting said activating signals to said mass-moving actuators for individually activating each of said mass-moving actuators to produce a complex tactile sensation as a result of varying the frequency and amplitude of said vibration.

8. An apparatus for providing a tactile sensation to a sensing body part in relation to a variable state of a measured body part, said apparatus comprising at least one vibrotactile unit, wherein each unit comprises:

a mass-moving actuator comprising a shaft and an eccentric mass mounted on said shaft for transmitting vibrations to said sensing body part, said mass moving actuator rotating said shaft;

wherein said apparatus further comprises:

a state sensor for measuring the variable state of said measured body part and generating a state signal in relation to said variable state; and a signal processor for receiving said state signal to produce an activating signal and transmitting said activating signal to said mass-moving actuator for activating said mass-moving actuator to produce a variable tactile sensation in relation to said variable state.

9. An apparatus according to claim 8, wherein said activating signal provides varying levels of activating said mass-moving actuator for varying the rotation of said shaft.

10. An apparatus according to claim 9, wherein said mass-moving actuator is a variable speed electric motor.

11. An apparatus according to claim 8, wherein said eccentric mass is pie-shaped.

12. An apparatus according to claim 8, comprising a plurality of vibrotactile units, wherein said signal processor produces multiple activating signals for individually activating each vibrotactile unit of said plurality of vibrotactile units to produce a complex tactile sensation.

13. An apparatus according to claim 8, wherein said apparatus has a plurality of state sensors, each state sensor for measuring the state of a different said measured body part.

14. An apparatus according to claim 8 further comprising a casing containing said vibrotactile unit.

15. An apparatus for providing a complex tactile sensation to a sensing body part in relation to a variable state signal, said apparatus comprising at least one vibrotactile unit, wherein each unit comprises:

a mass-moving actuator comprising a shaft and an eccentric mass mounted on said shaft for transmitting vibrations to said sensing body part, said mass moving actuator rotating said shaft;

wherein said apparatus further comprises a signal processor for interpreting said state signal to produce an activating signal and transmitting said activating signal to said mass-moving actuator for activating said mass-moving actuator to produce a variable complex tactile sensation in relation to said variable state signal.

16. An apparatus according to claim 15, comprising a plurality of vibrotactile units, wherein said signal processor produces multiple activating signals for individually activating each vibrotactile unit of said plurality of vibrotactile units to produce said complex tactile sensation.

17. A method for providing a tactile sensation to a sensing body part in relation to a variable state signal, employing an apparatus comprising a vibrotactile unit, wherein said vibrotactile unit comprises:

a mass-moving actuator comprising a shaft and an eccentric mass mounted on said shaft, said mass-moving actuator rotating said shaft; said method comprising:

producing said variable state signal in relation to a condition;

interpreting said state signal to produce an activating signal; and transmitting said activating signal to said mass-moving actuator for varying the rotation of said shaft to provide a tactile sensation to said sensing body part, said tactile sensation relating to said state signal as a result of varying the frequency or amplitude of vibration of said mass-moving actuator.

18. A method according to claim 17, wherein said mounting comprises mounting each of a plurality of vibrotactile units on different said sensing body parts; and said transmitting comprises transmitting individual activating signals to each of said vibrotactile units to produce a complex tactile sensation.

19. An eccentric mass vibrotactile unit for generating tactile vibration sensations and in communication with a host computer, the vibrotactile unit comprising:

motor means for rotating a shaft;

an eccentric mass coupled to said shaft;

means for receiving a signal from said host computer, said signal used to correlate events within a graphical computer simulation running on said host computer with a desired tactile sensation to be imparted by rotation of said eccentric mass; and means for modulating the current to said motor means based upon said signal, wherein the magnitude of the desired tactile sensation is controlled by modulating pulses of current sent to said motor means and the frequency of the desired tactile sensation is controlled independently of the magnitude by repeating pulses of current sent to said motor means at a selected rate.

20. An apparatus for providing a tactile sensation to a sensing body part in response to a variable state signal generated by a host computer, said apparatus comprising:

a mass-moving actuator comprising a shaft and an eccentric mass mounted on said shaft for transmitting vibrations to said sensing body part, said mass moving actuator rotating said shaft; and a signal processor, separate from said host computer, for receiving and interpreting said state signal to produce an activating signal and transmitting said activating signal to said mass-moving actuator for activating said mass-moving actuator to produce a variable tactile sensation in response to said variable state signal as a result of varying the frequency and amplitude of said vibration.

21. An apparatus according to claim 20, wherein said mass-moving actuator is an electric motor and said signal processor is connected to said host computer by communication means.

22. An apparatus according to claim 20, wherein said signal processor includes a signal processor computer for interpreting said state signal and causing said activating signal to be produced.

23. An apparatus according to claim 22 wherein said signal processor includes a driver that receives a control signal from said signal processor computer and produces said activating signal from said control signal.

24. An apparatus as recited in claim 20 wherein said activating signal is a current that is bi-directionally controlled to both accelerate and decelerate said mass.

25. An apparatus as recited in claim 20 wherein said host computer is running a computer simulation, wherein said variable state signal is produced based on said computer simulation.

26. An apparatus for providing a tactile sensation to a sensing body part in response to a variable state signal generated by a host computer, said apparatus comprising:
   a plurality of mass-moving actuators, each of said actuators comprising an associated shaft and an associated eccentric mass mounted on said shaft for transmitting vibrations to said sensing body part, each of said mass moving actuators rotating its associated shaft; and
   a signal processor, separate from said host computer, for receiving and interpreting said state signal to produce multiple activating signals and transmitting at least one of said activating signals to a mass-moving actuator for individually activating each of said mass-moving actuators to produce a complex tactile sensation in relation to said variable state signal as a result of varying the frequency and amplitude of said vibration.

27. A method for creating complex tactile sensations through a computer interface device, said sensations generated by driving an inertial mass to produce a force upon a user, said method comprising:
   providing a sensor in said computer interface device, said sensor tracking the motion of said computer interface device or an element thereof, wherein data from said sensor is used to update a graphical computer simulation;
   providing an inertial mass within said computer interface device, said inertial mass movable under software control by an actuator, said actuator capable of accelerating and decelerating said mass to create an impulse or vibration to be felt by a user;
   receiving a signal from a host computer, said signal used to correlate events within a graphical computer simulation with a desired tactile sensation by causing the acceleration or deceleration of said inertial mass, the desired tactile sensation to be perceived by said user, and
   based on the signal, modulating power to said actuator to selectively accelerate and decelerate said inertial mass so as to produce said desired tactile sensation having a magnitude and frequency that are independently variable.

28. A method as recited in claim 27 wherein the power to the actuator is modulated at a variable frequency.

29. A method as recited in claim 27 wherein the power is modulated as a sequence of pulses, the amplitude of each of said pulses affecting the magnitude of the tactile sensation and the frequency of said pulses affecting the perceived frequency of the tactile sensation.

30. A method as recited in claim 29 wherein both the amplitude of the pulses to the actuator and the frequency of the pulses to the motor are independently variable over time.

31. A method as recited in claim 27 wherein said computer interface device includes a plurality of actuators controlling a plurality of inertial masses, said actuators controllable in unison to create a complex tactile sensation.

32. A method as recited in claim 27 wherein said computer interface device includes a plurality of actuators controlling a plurality of inertial masses, said actuators spaced apart at a distance and controllable in sequence to create a tactile sensation that simulates motion across a bodily surface area in contact with said computer interface device.

33. A method as recited in claim 27 wherein said inertial mass and said actuator are both encased within a plastic housing.

34. A method as recited in claim 27 wherein a physical spring is coupled to said actuator to modify the natural frequency of the inertial mass system.

35. A method as recited in claim 27 wherein a particular graphical object within said graphical simulation is updated based upon said sensor data and wherein said desired tactile sensation is correlated with said particular graphical object touching another graphical object within said graphical simulation.

36. A method as recited in claim 35 wherein said particular graphical object is a graphical hand.

37. A method as recited in claim 27 wherein said complex tactile sensation corresponds with and is correlated to musical output provided by said host computer.

38. A method as recited in claim 27 wherein said actuator is a variable speed rotary motor.

39. A method as recited in claim 27 wherein said actuator is a linearly-moving actuator.

40. A method as recited in claim 29 wherein the magnitude of the pulses to the actuator are varied over time, thereby creating a non-uniform signal profile.

41. A method of decoupling control over the magnitude and frequency components of the tactile vibration sensations generated by an eccentric mass-based vibrotactile unit, said method comprising:
   providing a rotary motor with an eccentric mass coupled to a shaft of the rotary motor;
   receiving one or more signals from a host computer, said signals used to correlate events within a graphical computer with a desired tactile sensation to be imparted on a user by rotation of said eccentric mass; and
   based upon said signals controlling said rotary motor to produce said desired tactile sensation, the magnitude of tactile sensation being controlled by modulating the power sent to said motor, the frequency of the tactile sensation being controlled independently of said magnitude by repeating pulses of current sent to said motor at a selected rate.

42. A method as recited in claim 41 wherein said controlling said rotary motor is performed using a processor separate from said host computer.

43. An eccentric mass vibrotactile unit for generating tactile vibration sensations and in communication with a host computer, wherein the control over the magnitude and frequency components of said tactile vibration sensations are decoupled, the vibrotactile unit comprising:
   a rotary motor having a shaft;
   an eccentric mass coupled to said shaft of the rotary motor, and
   a processor separate from said host computer, said processor receiving a signal from said host computer, said signal used to correlate events within a graphical computer simulation running on said host computer with a desired tactile sensation to be imparted by rotation of said eccentric mass, wherein said processor controls said rotary motor based upon said signal, wherein the magnitude of the desired tactile sensation is controlled by modulating the power sent to said motor and the frequency of the desired tactile sensation is controlled independently of the magnitude by repeating pulses of current sent to said motor at a selected rate.

44. A method of decoupling control over the magnitude and frequency components of the tactile vibration forces generated by an eccentric mass-based vibrotactile unit, said method comprising:

providing a rotary motor with an eccentric mass coupled to a shaft of said rotary motor;

receiving one or more signals from a host computer, said signals used to correlate events within a graphical computer simulation with said desired tactile vibration forces to be imparted by rotation of said eccentric mass; and based upon said signal, using a processor separate from said host computer to control said rotary motor to produce said desired tactile vibration forces, the magnitude of the desired tactile vibration forces being controlled by modulating the power of drive signals sent to said motor, the frequency of the desired tactile vibration forces being controlled independently of said magnitude by modulating the frequency of said drive signals.

45. A method of controlling the magnitude and frequency components of tactile vibration forces generated by an eccentric mass-based vibrotactile unit, said method comprising:

providing a rotary motor with an eccentric mass coupled to a shaft of said rotary motor;

receiving one or more signals from a host computer, said signals used to correlate events within a graphical computer simulation with desired tactile vibration forces to be imparted by said vibrotactile unit on a user; and based upon said signals, controlling said rotary motor to produce said desired tactile vibration forces, the magnitude of the desired tactile vibration forces being controlled by modulating pulses of current sent to said motor, the frequency of the desired tactile forces being controlled independently of the magnitude by repeating pulses of current sent to said motor at a selected rate.

46. A method as recited in claim 45 wherein said controlling said rotary motor is performed using a processor separate from said host computer.

47. A method as recited in claim 45 wherein said pulses of current go to approximately zero magnitude at or before the time the eccentric mass completes a half rotation about the motor shaft.

48. A method as recited in claim 45 wherein said mass is attached to a mechanical spring element.

49. A method as recited in claim 45 wherein said motor is a variable speed rotary motor.

50. A method as recited in claim 45 wherein said desired tactile force is intended to represent a virtual interaction with a displayed graphical object.

51. A method as recited in claim 45 wherein the direction of said current is inverted at or before the time the eccentric mass completes a full rotation about the motor shaft.

52. A method as recited in claim 45 wherein a sensor is used to track the angular position of the eccentric mass as it rotates about the motor shaft, thereby allowing more precise control of said magnitude and frequency of said desired tactile vibration forces.

53. A method as recited in claim 45 wherein two or more eccentric mass-based vibrotactile units are used in combination, thereby conveying different amplitude or frequency profiles.

54. A method as recited in claim 45 wherein said tactile sensation is correlated with with a virtual interaction with a displayed graphical object.

55. A method as recited in claim 45 wherein said current is bi-directionally controlled to both accelerate and decelerate said mass.

56. A method as recited in claim 45 wherein velocity of the mass is brought to approximately zero between impulses of said desired tactile vibration forces.

57. A method of creating tactile sensations using a moving mass vibrotactile unit, said method allowing the independent control of magnitude and frequency of said tactile sensations, said method comprising:

providing an actuator with a movable mass attached, said actuator capable of accelerating and decelerating said mass to create an impulse or vibration sensation to a user, receiving one or more signals from a host computer, said signals used to correlate events within a graphical computer simulation with a desired tactile force to be imparted by the vibrotactile unit; and based upon said signals, using a processor separate from said host computer to control said actuator in order to selectively accelerate and decelerate said moving mass, the magnitude of the desired tactile force being controlled by adjusting the amplitude of a current signal sent to said actuator, the frequency of the desired tactile force being independently controllable by the frequency of said current signal sent to said actuator.

58. A method of creating tactile sensations using a moving mass vibrotactile unit, said method allowing the independent control of magnitude and frequency of said tactile sensations, said method comprising:

providing an actuator with a movable mass coupled thereto, said actuator capable of accelerating and decelerating said mass to create a desired tactile force upon a user;

receiving one or more signals from a host computer, said signals used to correlate events within a graphical computer simulation with said desired tactile force to be imparted by the vibrotactile unit; and based upon said signals, modulating the current to said actuator in order to selectively accelerate and decelerate said moving mass, the magnitude of the desired tactile force being controlled by adjusting the power of a signal sent to said actuator, the frequency of the desired tactile force being independently controllable by the frequency of a signal sent to said actuator.

59. A method as recited in claim 58 wherein said modulating is performed using a processor separate from said host computer.

60. A method as recited in claim 58 wherein said tactile sensation is intended to represent interaction with a graphical object with said graphical computer simulation.

* * * * *

Page US006275213C1

(12) EX PARTE REEXAMINATION CERTIFICATE (7220th)
United States Patent
Tremblay et al.

(10) Number: US 6,275,213 C1
(45) Certificate Issued: *Dec. 8, 2009

(54) TACTILE FEEDBACK MAN-MACHINE INTERFACE DEVICE

(75) Inventors: Mark R. Tremblay, Mountain View, CA (US); Mark H. Yim, Palo Alto, CA (US)

(73) Assignee: Immersion Corporation, San Jose, CA (US)

Reexamination Request:
No. 90/007,843, Dec. 13, 2005

Reexamination Certificate for:
Patent No.: 6,275,213
Issued: Aug. 14, 2001
Appl. No.: 09/561,782
Filed: May 1, 2000

(*) Notice: This patent is subject to a terminal disclaimer.

Related U.S. Application Data

(63) Continuation of application No. 09/066,608, filed on Apr. 24, 1998, now Pat. No. 6,088,017, which is a continuation of application No. 08/565,102, filed on Nov. 30, 1995, now abandoned.

(51) Int. Cl.
G10H 1/34 (2006.01)
G06F 3/00 (2006.01)

(52) U.S. Cl. .......................... 345/156; 414/5
(58) Field of Classification Search ................. 345/145, 345/146, 156–158; 414/1–7; 901/32–34
See application file for complete search history.

(56) References Cited

U.S. PATENT DOCUMENTS

| | | |
|---|---|---|
| 3,397,352 A | 8/1968 | Woodward |
| 3,623,064 A | 11/1971 | Kagan |
| 3,875,488 A | 4/1975 | Crocker et al. |
| 3,902,687 A | 9/1975 | Hightower |
| 3,911,416 A | 10/1975 | Feder |
| 3,919,691 A | 11/1975 | Noll |
| 4,030,208 A | 6/1977 | Carver et al. |
| 4,052,981 A | 10/1977 | Bachmann |
| 4,115,755 A | 9/1978 | Cotton |
| 4,148,014 A | 4/1979 | Burson |

(Continued)

FOREIGN PATENT DOCUMENTS

| | | |
|---|---|---|
| EP | 0 548 470 A1 | 3/1994 |
| EP | 0 585 470 B1 | 9/1994 |
| JP | 62-194389 | 12/1987 |
| JP | 02-079892 | 3/1990 |
| JP | 02-185278 | 7/1990 |

(Continued)

OTHER PUBLICATIONS

Nascar Racing Game Manual, 1994, CT–0447–CT0543.
Flight Unlimited Operator's Manual, 1995, CT–0544–CT0602.
Thorner, Craig, letter to J.B. Research dated Jan. 17, 1995.
Thorner, Craig, "Thank you for your interest in supporting intelliVIBE in Mig Alley!", Copyright 1995–2000.

(Continued)

Primary Examiner—Kim T Nguyen

(57) ABSTRACT

A man-machine interface which provides tactile feedback to various sensing body parts is disclosed. The device employs one or more vibrotactile units, where each unit comprises a mass and a mass-moving actuator. As the mass is accelerated by the mass-moving actuator, the entire vibrotactile unit vibrates. Thus, the vibrotactile unit transmits a vibratory stimulus to the sensing body part to which it is affixed. The vibrotactile unit may be used in conjunction with a spatial placement sensing device which measures the spatial placement of a measured body part. A computing device uses the spatial placement of the measured body part to determine the desired vibratory stimulus to be provided by the vibrotactile unit. In this manner, the computing device may control the level of vibratory feedback perceived by the corresponding sensing body part in response to the motion of the measured body part. The sensing body part and the measured body part may be separate or the same body part.

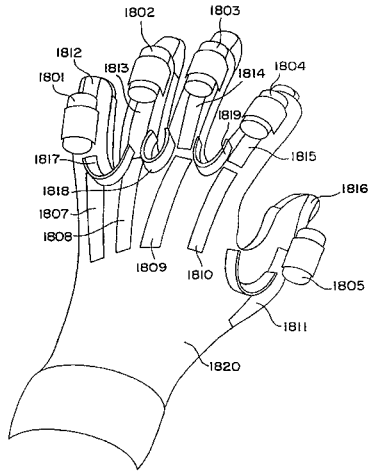

U.S. PATENT DOCUMENTS

| | | | |
|---|---|---|---|
| 4,262,549 A | 4/1981 | Schwellenbach | |
| 4,333,070 A | 6/1982 | Barnes | |
| 4,398,889 A | 8/1983 | Lam et al. | |
| 4,414,984 A | 11/1983 | Zarudiansky | |
| 4,436,188 A | 3/1984 | Jones | |
| 4,464,117 A | 8/1984 | Foerst | |
| 4,477,043 A | 10/1984 | Repperger | |
| 4,560,983 A | 12/1985 | Williams | |
| 4,604,016 A | 8/1986 | Joyce | |
| 4,706,294 A | 11/1987 | Ouchida | |
| 4,712,101 A | 12/1987 | Culver | |
| 4,731,603 A | 3/1988 | McRae et al. | |
| 4,769,763 A | 9/1988 | Trieb et al. | |
| 4,782,327 A | 11/1988 | Kley et al. | |
| 4,791,416 A | 12/1988 | Adler | |
| 4,794,384 A | 12/1988 | Jackson | |
| 4,795,296 A | 1/1989 | Jau | |
| 4,800,721 A | 1/1989 | Cemenska et al. | |
| 4,823,634 A | 4/1989 | Culver | |
| 4,839,838 A | 6/1989 | LaBiche et al. | |
| 4,856,078 A | 8/1989 | Konopka | |
| 4,857,881 A | 8/1989 | Hayes | |
| 4,868,549 A | 9/1989 | Affinito et al. | |
| 4,874,998 A | 10/1989 | Hollis, Jr. | |
| 4,879,556 A | 11/1989 | Duimel | |
| 4,885,565 A | 12/1989 | Embach | |
| 4,896,554 A | 1/1990 | Culver | |
| 4,949,119 A | 8/1990 | Moncrief et al. | |
| 4,961,138 A | 10/1990 | Gorniak | |
| 4,983,901 A | 1/1991 | Lehmer | |
| 5,007,300 A | 4/1991 | Siva | |
| 5,022,384 A | 6/1991 | Freels | |
| 5,044,956 A | 9/1991 | Behensky et al. | |
| 5,047,952 A | 9/1991 | Kramer et al. | |
| 5,059,150 A | 10/1991 | Kuo | |
| 5,072,361 A | 12/1991 | Davis et al. | |
| 5,076,517 A | 12/1991 | Ferranti et al. | |
| 5,103,404 A | 4/1992 | McIntosh | |
| 5,107,262 A | 4/1992 | Cadoz et al. | |
| 5,143,505 A | 9/1992 | Burdea et al. | |
| 5,146,566 A | 9/1992 | Hollis, Jr. et al. | |
| 5,165,897 A | 11/1992 | Johnson | |
| 5,175,459 A | 12/1992 | Danial et al. | |
| 5,184,319 A | 2/1993 | Kramer | |
| 5,185,561 A | 2/1993 | Good et al. | |
| 5,186,629 A | 2/1993 | Rohen | |
| 5,193,963 A | 3/1993 | McAffee et al. | |
| 5,197,003 A | 3/1993 | Moncrief et al. | |
| 5,203,563 A | 4/1993 | Loper, III | |
| 5,204,600 A | 4/1993 | Kahkoska | |
| 5,209,661 A | 5/1993 | Hildreth et al. | |
| 5,212,473 A | 5/1993 | Louis | |
| 5,220,260 A | 6/1993 | Schuler | |
| 5,223,776 A | 6/1993 | Radke et al. | |
| 5,228,356 A | 7/1993 | Chuang | |
| 5,264,768 A | 11/1993 | Gregory et al. | |
| 5,275,565 A | 1/1994 | Moncrief | |
| 5,280,265 A | 1/1994 | Kramer et al. | |
| 5,283,970 A | 2/1994 | Aigner | |
| 5,286,203 A | 2/1994 | Fuller et al. | |
| 5,296,846 A | 3/1994 | Ledley | |
| 5,296,871 A | 3/1994 | Paley | |
| 5,309,140 A | 5/1994 | Everett, Jr. et al. | |
| 5,313,230 A | 5/1994 | Venolia et al. | |
| 5,327,790 A | 7/1994 | Levin et al. | |
| 5,354,162 A | 10/1994 | Burdea et al. | |
| 5,355,148 A | 10/1994 | Anderson | |
| 5,366,376 A | 11/1994 | Copperman et al. | |
| 5,368,484 A | 11/1994 | Copperman et al. | |
| 5,379,663 A | 1/1995 | Hara | |
| 5,381,080 A | 1/1995 | Schnell et al. | |
| 5,388,992 A | 2/1995 | Franklin et al. | |
| 5,389,865 A | 2/1995 | Jacobus et al. | |
| 5,396,266 A | 3/1995 | Brimhall | |
| 5,396,267 A | 3/1995 | Bouton | |
| 5,399,091 A | 3/1995 | Mitsumoto | |
| 5,405,152 A | 4/1995 | Katanics et al. | |
| 5,414,337 A | 5/1995 | Schuler | |
| 5,429,140 A | 7/1995 | Burdea et al. | |
| 5,436,622 A | 7/1995 | Gutman et al. | |
| 5,437,607 A | 8/1995 | Taylor | |
| 5,437,608 A | 8/1995 | Cutler | |
| 5,451,924 A | 9/1995 | Massimino et al. | |
| 5,459,382 A | 10/1995 | Jacobus et al. | |
| 5,473,235 A | 12/1995 | Lance et al. | |
| 5,482,051 A | 1/1996 | Reddy et al. | |
| 5,506,605 A | 4/1996 | Paley | |
| 5,512,919 A | 4/1996 | Araki | |
| 5,513,100 A | 4/1996 | Parker et al. | |
| 5,541,831 A | 7/1996 | Thomas | |
| 5,542,672 A | 8/1996 | Meredith | |
| 5,547,382 A | 8/1996 | Yamasaki et al. | |
| 5,559,432 A | 9/1996 | Logue | |
| 5,565,840 A | 10/1996 | Thorner et al. | |
| 5,575,761 A | 11/1996 | Hajianpour | |
| 5,576,727 A | 11/1996 | Rosenberg et al. | |
| 5,583,478 A | 12/1996 | Renzi | |
| 5,587,937 A | 12/1996 | Massie et al. | |
| 5,589,828 A | 12/1996 | Armstrong | |
| 5,589,854 A | 12/1996 | Tsai | |
| 5,601,529 A | 2/1997 | Wollman | |
| 5,629,594 A | 5/1997 | Jacobus et al. | |
| 5,631,861 A | 5/1997 | Kramer | |
| 5,634,794 A | 6/1997 | Hildreth et al. | |
| 5,642,469 A | 6/1997 | Hannaford et al. | |
| 5,643,087 A | 7/1997 | Marcus et al. | |
| 5,656,901 A | 8/1997 | Kurita | |
| 5,666,138 A | 9/1997 | Culver | |
| 5,666,473 A | 9/1997 | Wallace | |
| 5,669,818 A | 9/1997 | Thorner et al. | |
| 5,684,722 A | 11/1997 | Thorner et al. | |
| 5,691,898 A | 11/1997 | Rosenberg et al. | |
| 5,709,219 A | 1/1998 | Chen et al. | |
| 5,714,978 A | 2/1998 | Yamanaka et al. | |
| 5,734,373 A | 3/1998 | Rosenberg et al. | |
| 5,736,978 A | 4/1998 | Hasser et al. | |
| 5,739,811 A | 4/1998 | Rosenberg et al. | |
| 5,742,278 A | 4/1998 | Chen et al. | |
| 5,754,023 A | 5/1998 | Roston et al. | |
| 5,755,577 A | 5/1998 | Gillio | |
| 5,767,839 A | 6/1998 | Rosenberg | |
| 5,781,172 A | 7/1998 | Engel et al. | |
| 5,784,052 A | 7/1998 | Keyson | |
| 5,790,108 A | 8/1998 | Salcudean et al. | |
| 5,805,140 A | 9/1998 | Rosenberg et al. | |
| 5,816,823 A | 10/1998 | Naimark et al. | |
| 5,889,670 A | 3/1999 | Schuler et al. | |
| 5,889,672 A | 3/1999 | Schuler et al. | |
| 5,897,437 A | 4/1999 | Nishiumi et al. | |
| 5,944,151 A | 8/1999 | Jakobs et al. | |
| 5,973,670 A | 10/1999 | Barber et al. | |
| 5,986,643 A | 11/1999 | Harvill et al. | |
| 6,004,134 A | 12/1999 | Marcus et al. | |
| 6,088,017 A | 7/2000 | Tremblay et al. | |
| 6,104,158 A | 8/2000 | Jacobus et al. | |
| 6,160,489 A | 12/2000 | Perry et al. | |
| 6,184,868 B1 | 2/2001 | Shahoian et al. | |
| 6,198,206 B1 | 3/2001 | Saarmaa et al. | |
| 6,275,213 B1 | 8/2001 | Tremblay et al. | |
| RE37,374 E | 9/2001 | Roston et al. | |

FOREIGN PATENT DOCUMENTS

| JP | 02-295014 | 12/1990 |
|----|-----------|---------|
| JP | 03-097485 | 4/1991 |
| JP | H4-8381 | 1/1992 |
| JP | 04-008381 | 1/1992 |
| JP | 04-092691 | 3/1992 |
| JP | 04-133858 | 5/1992 |
| JP | 04-232829 | 8/1992 |
| JP | 5-23095 | 3/1993 |
| JP | 05-49668 | 3/1993 |
| JP | 05-192449 | 8/1993 |
| JP | 06-18341 | 1/1994 |
| JP | 07-024147 | 1/1995 |
| WO | WO 91/11775 | 8/1991 |
| WO | WO 93/18475 | 9/1993 |
| WO | WO 95/32459 | 11/1995 |

OTHER PUBLICATIONS

Thorner, Craig, letter to Interactive Magic dated Mar. 3, 1995.

Thorner, Craig, "Thank you for your consideration of supporting intelliVIBE in Hard Truck", Copyright 1995–2000.

Thorner, Craig, "Thank you for your interest in supporting intelliVIBE in Mig Alley!", Copyright 1995–2000.

Thorner, Craig, "Thank you for your interest in supporting intelliVIBE in Gunship!", Copyright 1995–2000.

Thorner, Craig, This Disclaimer Contains Confidential and Proprietary Information regarding intelliVIBE, Copyright 1995–2000.

Thorner, Craig, "Thank you for your consideration of supporting intelliVIBE in Panzer Elite!", Copyright 1995–2000.

Thorner, Craig, "Thank you for your consideration of supporting intelliVIBE in Mig Alley!", Copyright 1995–2000.

Thorner, Craig, Thank you for your interest in supporting intelliVIBE in USAF!, Copyright 1995–2000.

Thorner, Craig, This Disclaimer Contains Confidential and Proprietary Information regarding IntelliVIBE, Copyright 1995–2000.

Glass, Thomas K., "Level 1 intelliVibe Sysem Description", dated Mar. 15, 1995, PH–101–PH–107.

Thorner, Craig, Thank you for your interest in supporting intelliVIBE in Mig Alley!, Copyright 1995–2000, CT–2146–CT–2156.

Thorner, Criag, letter to Interactive Magic dated Mar. 3, 1995.

Thorner, Craig, letter to Interactive Magic dated Mar. 3, 1995.

Thorner, Criag, "Thank you for your interest in supporting intelliVIBE in Mig Alley!", Copyright 1995–2000.

Thorner, Craig, "Thank you for your consideration of supporting intelliVIBE in Panzer Elite!", Copyright 1995–2000, CT–2387–CT–2504.

Glass, Thomas K., "Level 1 intellVibe System Description", dated Mar. 15, 1995.

A. David Johnson, "Shape–Memory Alloy Tactical Feedback Actuator", AAMRL–TR–90–039, Phase I—Final Report, Air Force SBIR Contract F33–88–C–0541, Feb. 1–Aug. 1, 1989, 38 pgs.

Stephen C. Jacobsen et al., "High Performance, Dextrous Telerobotic Manipulator With Force Reflection", The Center for Engineering Design, MSX 0009707, Intervention/ROV '91 Conference & Exposition May 21–23, 1991, pp. 213–218.

Blake Hannaford, "Models of Remote Manipulation in Space", NASA Conf. Publication 10071, 1991, pp. 37–40.

B. Hannaford et al., "Force–Feedback Cursor Control", NASA Tech Brief, vol. 13, No. 11, Item 21, JPL Invention Report NPO–17520/7034, SON 0006566, Nov. 1989, 6 pgs.

Moise Goldstein, Jr. et al., "Tactile Aids for Profoundly Deaf Children", J. of Acoustical Soc. Of America, vol. 77, No. 1, Jan. 1985, MSX 0025811, 8 pgs.

Sara Frisken–Gibson, et al., "A 64–Solenoid, Four–Level Fingertip Search Display for the Blind", 1987 IEEE, MSX 0025790, pp. 963–965.

S.S. Fisher et al., "Virtual Interface Environment Workstations", Pro. of the Human Factors Soc.—$32^{nd}$ Annual Meeting, 1988, MSX 0009529, pp. 91–95.

S. Eberhardt et al., "OMAR—A Hapatic Display for Speech Perception by Deaf and Deaf–Blind Individuals", 1993 IEEE, MSX 0025913, pp. 195–201.

William R. Corliss et al., "Teleoperator Controls", An AEC–NASA Technology Survey, NASA SP–5070, Dec. 1968, pp. 1–162.

Grigore Burdea, "Force and Touch Feedback For Virtual Reality", A Wiley–Interscience Pulbication, 1996, pp. 199–223.

Frederick P. Brooks, Jr., "Grasping Reality Through Illusion–Interactive Graphics Serving Science", 1988, MSX 0009502.

Mikael Bostrom et al., "Design of An Interactive Lumbar Puncture Simulator With Tactile Feedback", 1993 IEEE, MSX 0019056, pp. 280–286.

S.J. Bolanowski, Jr., "Four Channels Mediate the Mechanical Aspects of Touch", J. Acoust. Soc. Am., vol. 84, No. 5, Nov. 1988, MSX 0013662, pp. 1680–1694.

James C. Bliss et al., "Optical–to–Tactile Image Conversion for the Blind", IEEE Transactions of Man–Machine Systems, vol. MMS–11, No. 1, Mar. 1970, MSX 0025821, pp. 58–65.

A. Bejczy et al., "Universal Computer Control System (UCCS) For Space Telerobots", 1987 IEEE, MSX 0018967, pp. 318–324.

A. Bejczy, "Sensors, Controls and Man–Machine Interface for Advanced Teleoperation", Science, Jun. 20, 1980, vol. 208, No. 4450, MSX 0019039, pp. 1327–1335.

A. Bejczy et al., "Generalization of Bilateral Force–Reflecting Control of Manipulators", Fourth CISM–IFToMM Symposium, Sep. 8–12, 1981, MSX 0018974, 14 pgs.

A. Bejczy et al., "A Laboratory Breadboard System For Dual–Arm Teleoperation", SOAR '89 Workshop, Jul. 25–27, 1989, MSX 0018988, pp. 1–12.

A.K. Bejczy et al., "Kinesthetic Coupling Between Operator And Remote Manipulator", Int'l. Computer Tech. Conf., Aug. 12–15, 1908, MSX 0018957, 9 pgs.

S. Baigrie, "Electric Control Loading—A Low Cost, High Performance Alternative", Proceedings, Nov. 6–8, 1990, SON 0011836, pp. 247–253.

CyberMan 3D Swift Supplement Version 1.0a (Revised—Feb. 10, 1994) Logitech, McVicar Exhibit 138; Bates Stamp LOGI 0098 thru LOGI 0131.

IBM Technical Disclosure Bulletin; vol. 32, No. 9B, Feb. 1990; Bate Stamp SON 0016679 thru SON 0016684.

Virtual Reality; Spring 1995, Special Report; A Miller Freeman Publication; Bate Stamp SON 0102447 thru SON 0102526.

VREAM®, Virtual Reality Development System; User's Guide 1.0; Copyright ® 1993 by VREAM, Inc., Bate Stamp SON 0103481 thru SON 0104256.

VREAM®, Virtual Reality Development System; Reference Manual; Copyright © 1993 by VREAM, Inc., Bate Stamp SON 0102955 thru SON0103480.

Matthias M. Wloka et al., "The Virtual Tricorder: A Uniform Interface for Virtual Reality"; Science and Technology Center for Computer Graphics and Scientific Visualization, Brown University; Nov. 14–17, 1995; pp. 39 and 40; Bate Stamp SON 0016685 thru SON 0016686.

Report of Flight Simulator Technical Sub–Committee 7$^{th}$ Meeting Montreal, Sep. 17–20, 1984, DOC.GEN/2834, MSX 0025504, 17 pgs.

McVicar, Logitech 1994 Annual Review, Exhibit 136, LOGI 0132–0159.

B. Schmult et al., "Application Areas For A Gorce–Feedback Joystick", DSC–Advanced in Robotics, vol. 49, ASME 1993, pp. 47–54.

VRWorld, The Magazine for Virtual Reality Development and Utilization, Jan./Feb. 1995, SON 0102885–0102954.

T. Kotoku et al., "Environment Modeling for the Interactive Display (EMID) Used in Telerobotic Systems", IEEE Cat. No. 91TH0375–6, MSX 0019086, Nov. 3–5, 1991, pp. 999–1004.

T. Kotoku, "A Predictive Display With Force Feedback and Its Application to Remote Manipulation System With Transmission Time Delay", IEEE/RSJ International Conf. on Intelligent Robots and Systems, Jul. 7–10, 1992, pp. 239, 245–246.

J. Kirman, "Tactile Perception of Computer–Derived Formant Patterns From Voiced Speech",The J. of the Acoustical Society of America, MSX 0025859, vol. 55, No. 1, Jan. 1974, pp. 163–169.

W. Kim et al., "Graphics Displays for Operator Aid in Telemanipulation", 1991 IEEE International Conf. on Systems, Man, and Cybernetics, vol. 2, MSX 0018947, Oct. 13–16, 1991, pp. 1059–1067.

K. Kaczmarek, et al., "Electrotactile and Vibrotactile Displays for Sensory Substitution Systems", IEEE Transactions on Biomedical Eng., vol. 38, No. 1, Jan. 1991, pp. 1–16.

Bernard Dov Adelstein, "A Virtual Environment System For The Study of Human Arm Tremor", Massachusetts Institute of Technology, Jun. 1989, pp. 1–252.

G. Sun, "Along for the Ride?", Scientific American, Jul. 1991, pp. 95–106.

R. Stone, "Advanced Human–System Interfaces for Telerobotics Using Virtual Reality & Telepresence Technologies", IEEE, 1991, pp. 168–173.

N. Durlach et al., "Virtual Reality Scientific and Technological Challenges", National Academy, Press, 1995, pp. 1–528.

J. Wlassich, "Nonlinear Force Feedback Impedance Control", BSME Univ. of Rhode Island, 1983, pp. 1–259.

B. York et al., "Tools to Support Blind Programmers", ACM Press, 1989 ACM Seventeenth Annual Computer Science Conf., Feb. 21–23, 1989, pp. 5–11.

B. Marcus, "Touch Feedback in Surgery", Virtual Reality and Medicine The Cutting Edge, Sep. 8–11, 1994, MSX 0019163, pp. 96–97.

R. Stone, "Virtual Reality and Telepresence", Robotics, vol. 10, 1992, pp. 461–467.

G. Tan et al., "Human Factors for the Design of Force–Reflecting Haptic Interfaces", ASME WAM, 1994, MSX 0019470, pp. 2–11.

J.A. Terry, "Tactile Feedback in a Computer Mouse", IEEE, 1988, MSX 0025799–0025810, pp. 146–.

H. Tan et al., "Manual Resolution of Compliance When Work and Force Cues are Minimized", ASME, 1993, SON 0018727, pp. 99–104.

H. Traunmüller, "The Sentiphone: A Tactual Speech Communication Aid", J. of Communication Disorders, Elsevier, 1980, MSX 0025893–98, 6 pgs.

B. White, "Perceptual Findings With the Vision–Substitution System", IEEE, vol. MMS–11, No. 1, 1970, MSX 0025777, pp. 54–58.

M. Ouh–Young et al., "Using A Manipulator For Force Display In Molecular Docking", IEEE, 1988, MSX 0010265, pp. 1824–1829.

M. Ouh–Young et al., "Force Display Performs Better than Visual Display In A Simple 6–D Docking Task", IEEE, 1989, MSX 0010260, pp. 1462–1466.

S. Lee et al., "Computer Control of Space–Borne Teleoperators With Sensory Feedback", IEEE, 1985, pp. 205–214.

B. Marcus et al., "Exotic Input Devices", NCGA '91 Conf. & Expo., Apr. 22–25, 1991, pp. 293–299.

B. Marcus, "Hands On:Haptic Feedback in Surgical Simulation", Medicine Meets Virtual Reality II, Jan. 27–30, 1994, pp. 134–139.

C.M. Reed et al., "Research on the Tadoma Method of Speech Communication", MSX 0013630, J. Acoust. Soc. Am., vol. 77, No. 1, 1985, pp. 247–257.

W.M. Rabinowitz et al., "Multidimensional Tactile Displays: Identification of Vibratory Intensity, Frequency, and Contactor Area", J. Acoust. Soc. Am, vol. 82, No. 4, Oct. 1987, MSX 0013651, pp. 1243–1252.

P. Platt et al. "Low–Cost Approaches to Virtual Flight Simulation", IEEE, 1991, MSX 0019117, pp. 940–946.

W. Schneider, "The Tactile Array Stimulator", Johns Hopkins APL Technical Digest, vol. 9, No. 1, 1988, pp. 39–43.

J.K. Salisbury et al., "Virtual Environment Technology for Training", BBN Report No. 7661, Mar. 1992, pp. 27–40.

A.M. Sabatini et al., "Force Feedback–Base Telemicromanipulation For Robot Surgery on Soft Tissues", IEEE, 1989, MSX 0019014, 2 pgs.

K. Shimoga, "Finger Force and Touch Feedback Issues in Dexterous Telemanipulation", IEEE, 1992, pp. 159–178.

"Call It Palpable Progress", Virtual Reality, Business Week, Oct. 9, 1995, MSX 0010447, 3 pgs.

F.M. Smith et al., "Telerobotic Manipulator for Hazardous Environments", J. Robotic Systems, vol. 9, No. 2, 1992, MSX 0019017, pp. 251–260.

M. Ouh–Young et al., "A Low–Cost Force Feedback Joystick and Its Use in PC Video Games", IEEE, 1995, MSX 0024296, pp. 787–794.

M. Noll, "Man–Machine Tactile Communication", Polytechnic Inst. Of Brooklyn, Jun. 1971, MSX 0010542, pp. 1–89.

M. Minsky, "The Sandpaper System for Synthesizing Texture for a Force–Feedback Display", Mass. Inst. Of Tech., Jun. 1995, MSX 0025528, pp. 1–217.

L. Rosenberg, "Virtual Fixtures: Perceptual Overlays Enhance Operator Performance In Telepresence Tasks", 1994, SON 0005486, pp. 1–214.

The Electrical Engineering Handbook, Dorf, ed., 1993, pp. 711–713.

Logitech, Inc., CyberMan 3D Swift Supplement, Version 1.0a, revised Feb. 10, 1994.

Roehl, B., "Hardware Review, The Logitech CyberMan," VR World, Jan./Feb. 1995, pp. 58–59.

VREAM, Inc., VREAM Virtual Reality Development System User's Guide 1.0, 1993, pp. 4–8; 5–20 to 5–21; and 9–23.

VREAM, Inc., VREAM Virtual Reality Development System Reference Manual 1.0, 1993, 1–141 and 1–147 to 1–148.

Logitech, Inc., CyberMan 3D Controller Data Sheet, copyright 1993.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 3, 5, 6, 15, 17 and 20 are determined to be patentable as amended.

Claims 16, 21 and 25, dependent on an amended claim, are determined to be patentable.

Claims 1, 4, 7–14, 18–19, 22–24 and 26–60 were not reexamined.

2. [A system according to claim 1,] *A system for providing a tactile sensation to a sensing body part in relation to a variable state signal, said system comprising:*
   *means for generating said variable state signal;*
   a mass-moving actuator comprising a shaft and an eccentric mass mounted on said shaft for transmitting vibrations to said sensing body part, said mass moving actuator rotating said shaft;
   a signal processor for receiving and interpreting said state signal to produce an activating signal and transmitting said activating signal to said mass-moving actuator for activating said mass-moving actuator to produce a variable tactile sensation in relation to said variable state signal as a result of varying the frequency and amplitude of said vibration, and
   *a sensor mounted on said shaft to track the angular position of the eccentric mass as it rotates about the shaft;*
   wherein*:*
   said activating signal provides varying levels of activating said mass-moving actuator for varying the rotation of said shaft*; and*
   *a normalized current I applied to the actuator follows the following non-linear control law:*

$I=1, (\delta \geq \Theta > \pi);$ $I=-1\ (\pi \geq \Theta \geq 2\pi - \delta);\ and$ $I=0, (-\delta > \Theta > \delta);$ where:
   $\Theta$ *is an angular position of the actuator in radians; and*
   $\delta$ *is a small angular value.*

3. A system according to claim [1] *2*, wherein said mass-moving actuator is an electric motor and said apparatus comprises electrical connection means connecting said electric motor to said signal processor.

5. A system according to claim [1] *2*, comprising a plurality of mass-moving actuators.

6. A system according to claim [1] *2* further comprising a casing containing said mass-moving actuator.

15. An apparatus for providing a complex tactile sensation to a sensing body part in relation to a variable state signal, said apparatus comprising at least one vibrotactile unit, wherein each unit comprises:
   a mass-moving actuator comprising a shaft and an eccentric mass mounted on said shaft for transmitting vibrations to said sensing body part, said mass moving actuator rotating said shaft; *and*
   *a sensor mounted on said shaft to track the angular position of the eccentric mass as it rotates about the shaft,*
   wherein said apparatus further comprises a signal processor for interpreting said state signal to produce an activating signal and transmitting said activating signal to said mass-moving actuator for activating said mass-moving actuator to produce a variable complex tactile sensation in relation to said variable state signal*; and*
   *wherein a normalized current I applied to the actuator follows the following non-linear control law;*

$I=1, (\delta \geq \Theta > \pi);$ $I=-1\ (\pi \geq \Theta \geq 2\pi - \delta);\ and$ $I=0, (-\delta > \Theta > \delta);$ where:
   $\Theta$ *is an angular position of the actuator in radians; and*
   $\delta$ *is a small angular value.*

17. A method for providing a tactile sensation to a sensing body part in relation to a variable state signal, employing an apparatus comprising a vibrotactile unit, wherein said vibrotactile unit comprises:
   a mass-moving actuator comprising a shaft and an eccentric mass mounted on said shaft, said mass-moving actuator rotating said shaft; *and*
   *a sensor mounted on said shaft to track an angular position of the eccentric mass as it rotates about the shaft;*
   said method comprising:
   producing said variable state signal in relation to a condition;
   interpreting said state signal to produce an activating signal; and
   transmitting said activating signal to said mass-moving actuator for varying the rotation of said shaft to provide a tactile sensation to said sensing body part, said tactile sensation relating to said state signal as a result of varying the frequency or amplitude of vibration of said mass-moving actuator,
   *wherein a normalized current I applied to the actuator follows the following non-linear control law:*

$I=1, (\delta \geq \Theta > \pi);$ $I=-1\ (\pi \geq \Theta \geq 2\pi - \delta);\ and$ $I=0, (-\delta > \Theta > \delta);$ where:
   $\Theta$ *is an angular position of the actuator in radians; and*
   $\delta$ *is a small angular value.*

20. An apparatus for providing a tactile sensation to a sensing body part in response to a variable state signal generated by a host computer, said apparatus comprising:
   a mass-moving actuator comprising a shaft and an eccentric mass mounted on said shaft for transmitting vibrations to said sensing body part, said mass moving actuator rotating said shaft; [and]

a signal processor, separate from said host computer, for receiving and interpreting said state signal to produce an activating signal and transmitting said activating signal to said mass-moving actuator for activating said mass-moving actuator to produce a variable tactile sensation in response to said variable state signal as a result of varying the frequency and amplitude of said vibration, *and*

*a sensor mounted on said shaft to track the angular position of the eccentric mass as it rotates about the shaft,*

*wherein a normalized current I applied to the actuator follows the following non-linear control law:*

$I=1, (\delta \geq \Theta > \pi)$;

$I=-1\ (\pi \geq \Theta \geq 2\pi - \delta);$ *and*

$I=0, (-\delta > \Theta > \delta)$;

*where:*

$\Theta$ *is an angular position of the actuator in radians; and*

$\delta$ *is a small angular value.*

\* \* \* \* \*